United States Patent
Lim

(10) Patent No.: US 12,289,392 B2
(45) Date of Patent: Apr. 29, 2025

(54) ENCRYPTION, DECRYPTION, AND METHOD INVOLVING DIOPHANTINE EQUATION AND COMMUNICATION THEREOF BY WAVE TRANSMISSION

(71) Applicant: Aires Investment Holdings Private Limited, Singapore (SG)

(72) Inventor: Meng Liang Lim, Singapore (SG)

(73) Assignee: Aires Investment Holdings Private Limited, Singapore (SG)

( * ) Notice: Subject to any disclaimer, the term of this patent is extended or adjusted under 35 U.S.C. 154(b) by 279 days.

(21) Appl. No.: 17/891,110

(22) Filed: Aug. 18, 2022

(65) Prior Publication Data
US 2023/0082543 A1 Mar. 16, 2023

(30) Foreign Application Priority Data

Sep. 9, 2021 (SG) .......................... 10202109894Y
Aug. 2, 2022 (SG) .......................... 10202250655T

(51) Int. Cl.
H04L 9/06 (2006.01)
G06N 5/02 (2023.01)
H04L 9/08 (2006.01)

(52) U.S. Cl.
CPC ............ H04L 9/0618 (2013.01); G06N 5/02 (2013.01); H04L 9/0861 (2013.01)

(58) Field of Classification Search
CPC ... H04L 9/0618; H04L 9/0861; H04L 9/0891; H04L 9/06; G06N 5/02; G06N 5/022; G06N 20/00
See application file for complete search history.

(56) References Cited

U.S. PATENT DOCUMENTS

| 2002/0152252 | A1  | 10/2002 | Kaminaga et al. |
| 2006/0251247 | A1  | 11/2006 | Akiyama et al. |
| 2015/0046708 | A1  | 2/2015  | Yasuda et al. |
| 2022/0045840 | A1* | 2/2022  | Honorio Araujo da Silva ............ H04L 9/3033 |
| 2024/0048363 | A1* | 2/2024  | Keith, Jr. .............. H04L 9/0643 |

OTHER PUBLICATIONS

Akiyama K. et al., "A Public-key Encryption Scheme Based on Non-linear Indeterminate Equations (Giophantus)," Cryptology ePrint Archive, 19, pp. 1-52, Report 2017/1241, Dec. 2017, 52 pages.
Abraham, S. et al., "A Connectionist Network Approach to Find Numerical Solutions of Diophantine Equations," arXivLabs, Jun. 9, 2012, 7 pages.
Abraham, S. et al., "Reciprocally induced coevolution: A computational metaphor in Mathematics," arXivLabs, Jun. 5, 2012, 11 pages.
Search Report of the Intellectual Property Office of Singapore in related Singaporean Patent Appl. No. 10202109894Y, dated Mar. 17, 2022, 4 pages.

* cited by examiner

Primary Examiner — Quazi Farooqui
(74) Attorney, Agent, or Firm — Bochner PLLC; Serge Krimnus

(57) ABSTRACT

Embodiments of the invention relate to symmetric encryption that converts plain text to Diophantine equations, i.e. cipher text, and communication of the Diophantine equations by electromagnetic, mechanical and/or matter waves or signals. More particularly, at least one wave characteristic of electromagnetic, mechanical and/or matter waves or signals are utilised to define the Diophantine equations.

22 Claims, 8 Drawing Sheets

Wavelength (m) and Frequency (Hz)

ENCRYPTION, DECRYPTION, AND METHOD INVOLVING DIOPHANTINE EQUATION AND COMMUNICATION THEREOF BY WAVE TRANSMISSION

FIELD OF THE INVENTION

Embodiments of the invention relate to symmetric key generation, encryption, and decryption which use insolvable Diophantine equation(s) as cipher text, and communication of such Diophantine equation(s) or cipher text using electromagnetic, mechanical, and/or matter waves or signals.

BACKGROUND

Cryptographic technology is normally classified into symmetric key encryption and public key encryption (or asymmetric key encryption). In symmetric key encryption, a sender and a recipient share the same key to encrypt and decrypt messages. In public key encryption, a sender and a recipient hold a public key and private key respectively, whereby the public key is accessible to all parties. The sender usually uses the public key to encrypt a message which only the recipient with a private key can decrypt.

Cryptography method and apparatus using Diophantine equations have been proposed, such as in US 2006/0251247 A1 (Akiyama et al.) and Giophantus™ public-key cryptosystem by Toshiba Corporation. However, such previously proposed cryptography method and apparatus were designed for public key encryption.

Furthermore, data is typically transmitted and/or received via binary code, such data transmission requires the conversion of binary code to data and vice versa. This requires an interpretation of the binary code and the American Standard Code for Information Interchange (ASCII) is commonly utilised for this purpose.

Diophantine equations are equations represented by numerals and mathematical operators that can be constructed with lesser number of characters than the alphabets of the English language. The utilisation of the ASCII to transmit and receive Diophantine equations would hence not necessarily be an efficient method to transmit and receive Diophantine equations.

SUMMARY

According to a first aspect of the invention, there is provided an encryption method comprising:
  receiving at least one plain text;
  converting the at least one plain text to at least one pre-encryption integer $(M_1, \ldots, M_n)$;
  using the at least one pre-encryption integer $(M_1, \ldots, M_n)$ and at least one variable solution set $(v_1, \ldots, v_n)$ derived from at least one symmetric key, generating at least one Diophantine equation solvable by the at least one variable solution set $(v_1, \ldots, v_n)$, including:
    using a first subset of the at least one variable solution set $(v_1, \ldots, v_n)$, generating at least one initial Diophantine equation; and
    using a concealment variable derived from a second subset of the at least one variable solution set $(v_1, \ldots, v_n)$, modifying the at least one initial Diophantine equation to generate the at least one Diophantine equation;
  predicting, using a trained AI model, insolvability or solvability of the at least one Diophantine equation;
  providing the at least one Diophantine equation as at least one cipher text if the at least one Diophantine equation is predicted, by the trained AI model, as insolvable, including:
    ascertaining a plurality of elements which define the at least one Diophantine equation; and
    providing a plurality of electromagnetic, mechanical, and/or matter waves having at least an element parameter defined by the plurality of elements.

Embodiments of the first aspect are provided as recited in claim 2 to claim 5.

According to a second aspect of the invention, there is provided an encryption apparatus comprising: at least one memory unit for storing computer-executable instructions; and at least one processor communicably coupled to the at least memory unit and configured to: execute the computer-executable instructions to perform the method according to any one of claim 1 to claim 5.

According to a third aspect of the invention, there is provided a non-transitory, computer readable medium comprising computer-executable instructions configured to direct at least one computer processor to perform the method according to any one of claim 1 to claim 5.

According to a fourth aspect of the invention, there is provided an encryption apparatus comprising:
  a plain text input unit configured to receive at least one plain text;
  a symmetric key input unit configured to receive at least one symmetric key;
  a plain text to integer unit communicably coupled to the plain text input unit and configured to: receive the at least one plain text from the plain text input unit and convert the at least one plain text to at least one pre-encryption integer $(M_1, \ldots, M_n)$;
  a polynomial generation unit communicably coupled to the symmetric key unit and configured to: receive the at least one symmetric key from the symmetric key unit and derive at least one variable solution set $(v_1, \ldots, v_n)$ using the at least one symmetric key;
  an encryption unit communicably coupled to the plain text to integer unit, the polynomial generation unit, wherein the encryption unit is configured to: receive the at least one variable solution set $(v_1, \ldots, v_n)$ from the polynomial generation unit, and generate at least one Diophantine equation solvable by the at least one variable solution set $(v_1, \ldots, v_n)$ using the at least one pre-encryption integer $(M_1, \ldots, M_n)$ and the at least one variable solution set $(v_1, \ldots, v_n)$ by being configured to: generate at least one initial Diophantine equation using a first subset of the at least one variable solution set $(v_1, \ldots, v_n)$, and modify the at least one initial Diophantine equation using a concealment variable which is derived from a second subset of the at least one variable solution set $(v_1, \ldots, v_n)$; and
  an AI unit communicably coupled to the encryption unit and configured to: receive the at least one Diophantine equation, the AI unit having a trained AI model configured to: predict insolvability or solvability of the at least one Diophantine equation,
  a wave provision unit communicably coupled to the encryption unit,
  wherein the encryption unit is configured to: provide the at least one Diophantine equation as at least one cipher text to the wave provision unit if the at least one Diophantine equation is predicted as insolvable by the AI model,
  wherein the wave provision unit is configured to: ascertain a plurality of elements which define the at least one Diophantine equation; and provide a plurality of electromagnetic, mechanical, and/or matter waves having at least an element parameter defined by the plurality of elements.

Embodiments of the fourth aspect are provided as recited in claim 9 to claim

According to a fifth aspect of the invention, there is provided a decryption method comprising:

receiving a plurality of electromagnetic, mechanical, and/or matter waves;

ascertaining a plurality of elements of the plurality of electromagnetic, mechanical, and/or matter waves;

using the plurality of elements, constructing at least one Diophantine equation;

using a symmetric key, deriving at least one variable solution set $(v_1, \ldots, v_n)$ for solving the at least one Diophantine equation;

using the at least one variable solution set $(v_1, \ldots, v_n)$, solving the at least one Diophantine equation to ascertain at least one pre-encryption integer $(M_1, \ldots, M_n)$, including:

using a first subset of the at least one variable solution set $(v_1, \ldots, v_n)$, ascertaining the at least one initial integer; and using a concealment variable derived from a second subset of the at least one variable solution set $(v_1, \ldots, v_n)$, modifying the at least one initial integer to ascertain the at least one pre-encryption integer $(M_1, \ldots, M_n)$; and converting the at least one pre-encryption integer $(M_1, \ldots, M_n)$ to at least one plain text.

Embodiments of the fifth aspect are provided as recited in claim 14 to claim 16.

According to a sixth aspect of the invention, there is provided a decryption apparatus comprising: at least one memory unit for storing computer-executable instructions; and at least one processor communicably coupled to the at least memory unit and configured to: execute the computer-executable instructions to perform the method according to any one of claim 13 to claim 16.

According to a seventh aspect of the invention, there is provided a non-transitory, computer readable medium comprising computer-executable instructions configured to direct at least one computer processor to perform the method according to any one of claim 13 to claim 16.

According to an eighth aspect of the invention, there is provided a decryption apparatus comprising:

a wave receiver unit configured to:

receive a plurality of electromagnetic, mechanical, and/or matter waves;

ascertain a plurality of elements of the plurality of electromagnetic, mechanical, and/or matter waves;

using the plurality of elements, construct at least one Diophantine equation as cipher text; a symmetric key input unit configured to receive at least one symmetric key; a decryption unit communicably coupled to the wave receiver unit and the symmetric key input unit, and configured to:

receive the symmetric key from the symmetric key input unit and the at least one Diophantine equation from the wave receiver unit;

using the symmetric key, derive at least one variable solution set $(v_1, \ldots, v_n)$ for solving the at least one Diophantine equation; using the at least one variable solution set $(v_1, \ldots, v_n)$, solve the at least one Diophantine equation to ascertain at least one pre-encryption integer $(M_1, \ldots, M_n)$ by being configured to:

using a first subset of the at least one variable solution set $(v_1, \ldots, v_n)$, ascertain at least one initial integer;

using a concealment variable derived from a second subset of the at least one variable solution set $(v_1, \ldots, v_n)$, modify the at least one initial integer to ascertain the at least one pre-encryption integer $(M_1, \ldots, M_n)$; and an integer to plain text unit communicably coupled to the decryption unit and configured to:

receive the at least one pre-encryption integer $(M_1, \ldots, M_n)$ from the decryption unit, and convert the at least one pre-encryption integer $(M_1, \ldots, M_n)$ to at least one plain text.

Embodiments of the eight aspect are provided as recited in claim 20 to claim 22.

BRIEF DESCRIPTION OF DRAWINGS

Embodiments of the invention will be described in detail with reference to the accompanying drawings, in which.

DETAILED DESCRIPTION

Figure 1:
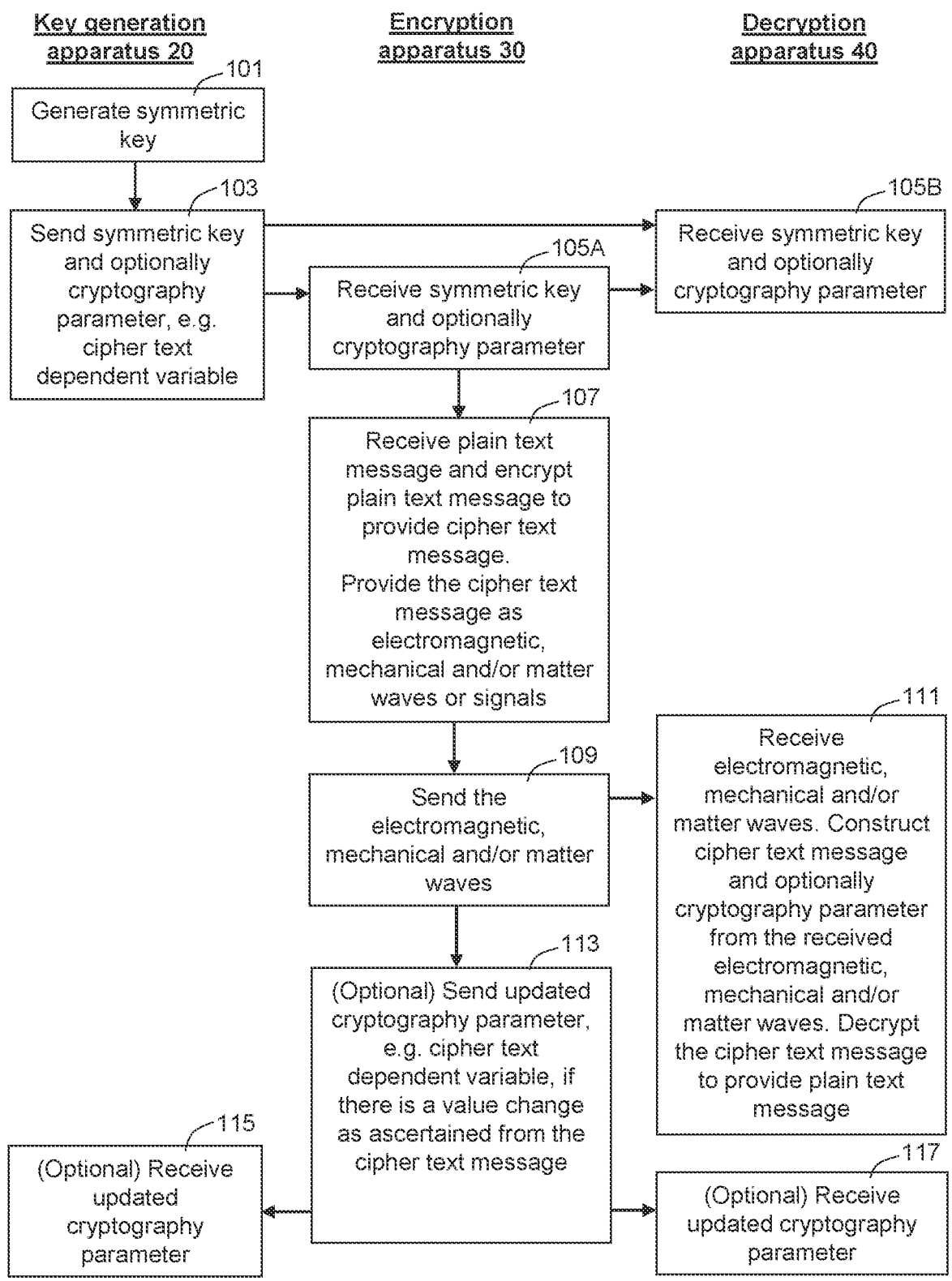
FIG. 1 is a simplified flow chart showing message exchanges among a key generation apparatus, an encryption apparatus, and a decryption apparatus.

In the following description, numerous specific details are set forth in order to provide a thorough understanding of various illustrative embodiments of the invention. It will be understood, however, to one skilled in the art, that embodiments of the invention may be practiced without some or all of these specific details. It is understood that the terminology used herein is for the purpose of describing particular embodiments only, and is not intended to limit the scope of the invention. In the drawings, like reference labels or numerals refer to same or similar functionalities or features throughout the several views. In the drawings, directional arrows shown between features illustrate data or information transfer therebetween in accordance with description of some embodiments but are not limited as such. In other words, data or information transfer in reverse to the directional arrows and/or not shown by directional arrow among features may be envisaged and are not shown to avoid obscuring description of the embodiments.

Embodiments described in the context of one of the apparatuses or methods are analogously valid for the other apparatuses or methods. Similarly, embodiments described in the context of an apparatus are analogously valid for a method, and vice versa.

Features that are described in the context of an embodiment or example may correspondingly be applicable to the same or similar features in the other embodiments or examples. Features that are described in the context of an embodiment or example may correspondingly be applicable to the other embodiments or examples, even if not explicitly described in these other embodiments or examples. Furthermore, additions and/or combinations and/or alternatives as described for a feature in the context of an embodiment or example may correspondingly be applicable to the same or similar feature in the other embodiments or examples.

It should be understood that the articles "a", "an" and "the" as used with regard to a feature or element include a reference to one or more of the features or elements. The term "and/or" includes any and all combinations of one or more of the associated feature or element. The terms "comprising", "including", "having", "involving" and any of their related terms, as used in description and claims, are intended to be open-ended and mean that there may be additional features or elements other than the listed ones. Identifiers such as "first", "second", "third", and so on, are used merely as labels, and are not intended to impose numerical requirements on their objects, nor construed in a manner imposing any relative position or time sequence between limitations.

The term "coupled" and related terms are used in an operational sense and are not necessarily limited to a direct physical connection or coupling. Thus, for example, two devices may be coupled directly, or via one or more intermediary devices. Based on the present disclosure, a person of ordinary skill in the art will appreciate a variety of ways in which coupling exists in accordance with the aforementioned definition. The terms "waves" and "signals", as well as their related terms, may be used interchangeably. Such waves or signals may be electromagnetic (e.g. radio waves, microwaves, infrared, ultraviolet, visible light, X-rays, gamma rays) or mechanical (e.g. sound), or matter. The term "about" when appended to a numerical figure may include references to the numerical figure.

Mathematical notations used herein are generally well-known. For avoidance of doubt, example notations are described as follows. The notation ˆ is used to denote power of. For example, $A\hat{\ }b=A^b$. For example, $x\hat{\ }2=(x)(x)=x^2$. The notation . or * is used to denote multiplication. For example, $A.B=A*B$. For example, $A/B=A\div B$. The notation / is used to denote division. For example, $A/B=A\div B$. The notation $\in$ is used to denote element of. The notation $\Rightarrow$ is used to denote implication symbol. For example, $A \Rightarrow B$ represents A is true implies B is true. The notation { } is used to denote a specific domain of elements. The notation $\pi$ is used to denote product function.

Introduction

Diophantine equations are algebraic equations for which only integer solutions are allowed. Unlike certain other mathematical or algebraic equations which may be solved by a general method or algorithm, different types of Diophantine equations may require different methods to solve. Hence, mathematicians had studied whether a general method to solve all Diophantine equations exists. According to Matiyasevich Theorem/MRDP Theorem, however, it was found there exists no general method or algorithm to solve all Diophantine equations which therefore are an undecidable problem. As such, it is presently impossible to use mathematical methods to determine the solvability of Diophantine equations in general.

Undecidable encryption refers to two-way encryption and decryption method whereby without a key, the only general method to decipher the encrypted cipher text is to solve an undecidable problem that requires either infinitely many algorithms and/or exist no general algorithm to solve. Hence, given the fact that there exists no general method or algorithm to solve an undecidable problem, for any class of cipher text that has been deciphered without key, there will remain infinitely many classes of cipher text which require infinitely many algorithms or methods to solve, and/or there will be finitely or infinitely many classes of cipher text which no method or algorithm can solve.

In view of the above, a general limitation of the Diophantine equation encryption is the lack of knowledge regarding which Diophantine equations are solvable and which are unsolvable. For example, one would know that irreducible polynomials and non-linear Diophantine equations make good candidates for unsolvable Diophantine equations, however it is not true that all irreducible and non-linear Diophantine equations are unsolvable.

Artificial intelligence (AI) enables learning from data and thus making predictions in an independent manner. However, AI has limited memory and generally requires boundaries and a fixed set of rules to function. In the context of undecidable encryption, the boundaries and rules are the boundaries and rules of the undecidable problem.

In view of the above and other issues, the invention employs undecidable encryption and AI, in combination. Such combination would change or evolve over time and get stronger by suitable training. Particularly, AI would exclude the generation of any class of cipher text that has been deciphered without key. Hence in context of Diophantine equations encryption, based on historical data of Diophantine equations that have been solved, AI would exclude any class of Diophantine equations, i.e. cipher text, which has been solved or deciphered without key, or known to be solvable. More particularly, when the encryption is paired with AI, only unsolved or unsolvable Diophantine equations based on known historical data will be used for encryption. In the event certain classes of Diophantine equations are solved in the future, the AI will exclude the use of these solved or solvable classes of Diophantine equation in encryption.

Polynomial Generation

Polynomial generation for constructing Diophantine equation from integers is explained herein with reference to non-limiting example(s).

EXAMPLE 1

Let $v_n$ denote the variables of a Diophantine equation, and let a symmetric key be denoted by $[y_1, y_2, y_3, z_1, z_2, z_3]$, variables $v_n$ may be defined as the following to provide a variable solution set $(v_1, v_2, v_3, \ldots, v_n)$ to solve a Diophantine equation:

When $0<n<4$, $$v_1=y_1+10^{z_1}$$

$$v_2=y_2+10^{z_2}$$

$$v_3=y_3+10^{z_3}$$

When n≥4, $$V_n = n + y_1 + y_2 + y_3$$

Let $y_1=1$, $y_2=2$, $y_3=3$, $z_1=1$, $z_2=2$, $z_3=3$ and based on the above definition, $v_1=11$, $v_2=102$, $v_3=1003$.

Let integer $X=10000$, $X$ may be expressed in the following ways or Diophantine equations:

$$X = (v_1)^2 + (v_2)^2 + (v_3)^2 - 1006534 \text{ or}$$

$$X = (v_2)^3 - (v_3)^2 + 20(v_1)^2 - 47619 \text{ or}$$

$$X = 10(v_3) + v_2 + v_1 - 143$$

In view of the above, there are numerous ways $X$ can be expressed in terms of $v_1$, $v_2$, $v_3$. In other words, $X$ can be expressed by numerous Diophantine equations and the symmetric key may generate more than one variable solution set $(v_1, \ldots, v_n)$ and infinitely many variables with a symmetric key having finite number of integers, Diophantine equations may have infinitely many solutions.

Undecidability of Diophantine Equations

Undecidability of Diophantine equations is explained herein with reference to non-limiting example(s).

EXAMPLE 2

Find all integer solutions to the equation: $a^n + b^n = c^n$

Given that $0 \le a \le 2$, $0 \le b \le 2$, $0 \le c \le 2$, $n=3$, by trial and error, it is obtained that $a=b=c=0$ is a solution to the equation above and it can shown that there is no positive integer solution. In this equation there are a total of 27 cases, hence it is decidable by trial and error.

Suppose the question is rephrased and the bounds on a, b, c, n are removed, and let a, b, c, n∈N, find all positive integer solutions to the equation: $a^n + b^n = c^n$ This famous equation is known as Fermat's last theorem and baffled mathematicians for over 300 years until it was solved by Andrew Wiles in 1995.

Here, in this example, it can be clearly seen that by removing the bounds on the variables a, b, c, n, the trial and error method will no longer work and it becomes harder to reach a conclusion.

However, as the equation has been solved, it is considered decidable as there exist a method to ascertain if there are integer solutions to an $a^n + b^n = c^n$.

Unsolvable Diophantine Equations

Generation of unsolvable Diophantine equations is explained herein with reference to non-limiting example(s).

In Example 2, an example of Diophantine equation is provided and boundaries of the variables are discussed. Suppose polynomial Diophantine equations are generated as per Example 1, as follows:

$$X = (v_1)^2 + (v_2)^2 + (v_2)^2 - 1006534$$

$$X = (v_2)^3 - (v^3)^2 + 20(v_1)^2 - 47619$$

$$X = 10(v_3) + v_2 + v_1 - 143$$

it would be obvious to others reading the cipher text that these equations have an integer solution, if they are used without modification.

Hence, it may be necessary to conceal the true equation with another variable, e.g. concealment variable, this is an important step to create an undecidable encryption. The above equations may be modified by adding variable $v_4$ to the right hand side of the equation. Let $v_4 = 20000$, the equations of Example 1 may be modified as follows:

$$X = (v_1)^2 + (v_2)^2 + (v_3)^2 - 1026534$$

$$X = (v_2)^3 - (v_3)^2 + 20(v_1)^2 67619$$

$$X = 10(v_3) + v_2 + v_1 - 20143$$

It has thus become possible that the equations, after modification, have no integer solution.

However, as $X$ remains a linear term, it is always possible that an integer solution is found.

For example, in $X = (v_1)^2 + (v_2)^2 + (v_3)^2 - 1026534$, let $V_1 = v_2 = v_3 = 1$, then $X = -1026531$.

However, if $X$ is converted into a non-linear term, and given that $v_1 = 11$, the equation $X = (v_1)^2 + (v_2)^2 + (v_3)^2 - 1006534$ may be modified as follows:

$$(v_1)X = (v_1)^3 + 11(v_2)^2 + 11(v_3)^2 11091874$$

$$(v_1)^2(X)^2 = 10000[(v_1)^4 + 121(v_2)^2 + 121(v_3)^2 121810614]$$

With variables that have higher degrees of power, each Diophantine equation becomes more complex and is non-obvious whether there is an integral solution. In view of the above, generation of polynomials is a multifaceted process and there are always numerous methods to generate different kind of polynomials.

Unbounded Variables Based on Finite Key Size

Generation of unbounded variables based on finite key size is explained herein with reference to non-limiting example(s).

Symmetric encryption keys have finite length sizes, defined normally in bits, with key sizes normally having 128, 192 or 256-bit size. A 128-bit key size key will have $2^{128}$ different combinations of key size while a 256-bit key size will have $2^{256}$ key size. Suppose the key size is 128 and given 4 variables $v_1$, $v_2$, $v_3$, $v_4$, suppose the variables are represented by integers from 1 to $2^{32}$ and 32 bits key size are allocated to each variable, there are a total of $(2^{32})^4$ or $2^{128}$ different combinations, however the variables are still bounded by $2^{32}$, e.g.

$Max[v_1] = 2^{32}$
$Max[v_2] = 2^{32}$
$Max[v_3] = 2^{32}$
$Max[v_4] = 2^{32}$

To create an undecidable encryption, variables with a maximum integer value cannot be used. Hence, instead of letting the variables be represented by integers directly, the symmetric key is used to construct integers. For example, with a 32-bit key length split into 2 variables $y_1$, $z_1$ of 16-bit each, the following can be constructed:

$$v_1 = y_1 + (100000000)^{z_1}$$

The maximum value of $v_1$ is then $65536 + (100000000)^{65536}$ which is a significantly higher value than $2^{32}$ or $4294967296$. However, the problem still remains despite the vast increased in boundaries and integer range that the variable can represent; in other words, there is still a maximum value on the variables.

The aforementioned problem may be solved with introduction of a cipher text dependent variable, K, which is dependent on the cipher text. Depending on the cipher text exchanged, value of cipher text variable, K, may or may not change.

EXAMPLE 3

Let initial value of K=10.
In cipher text 1 below, the value of K is unchanged.

$$X=(v_1)^2+(v_2)^3+1000\ (v_3)^5-25020$$

In cipher text 2 below, the value of K has changed from 10 to 1000, as cipher text 2 contains the variable $1000\ (v_3)^{10}$.

$$X=(v_1)^2+(v_2)^3+1000\ (v_3)^{10}-25020$$

In general, for any value of the cipher text dependent variable, K=C, the value of C is changed from C to A if and only if there is a variable in the Diophantine equation cipher text with polynomial degree C. and coefficient A.

In view of the above, using the symmetric key and cipher text dependent variable to construct variables will allow the variables constructed to be unbounded. This is an important feature for undecidable encryption methods.

In general, given $v_n$ is an integer constructed with integers including K, there exists $v_n$ such that $-\infty < K < \infty \Rightarrow -\infty < v_n < \infty$ [K is unbounded implies that there exists an integer constructed with K that is unbounded]. $K \in Z \Rightarrow v_n \in Z$ is an important condition for the usage of the cipher dependent variable. In practice, bounds may be introduced on the variables to speed up the process of encryption and decryption, however the limitations will be imposed by a lack of computing power rather than by design.

Integer Partitioning using Addition, Subtraction, Multiplication

Generation of a chosen number of Diophantine equations per encryption using integer partition method(s) is explained herein with reference to non-limiting example(s).

An integer may be partitioned by addition and/or subtraction. For example, an integer X=10000 may be partitioned or expressed by X=5000+1000+6000−2000, thereafter the partitioned integers 1000, 2000, 5000, and 6000 may be expressed as Diophantine equations. One limitation of this partitioning method is that the process can be reversed by combining the equations into a single equation.

An integer may be partitioned by multiplication. For example, an integer X=10000 may be partitioned or expressed by factorization X=10*10*100, thereafter the partitioned integers 10, and 100 may be expressed as Diophantine equations. One limitation of this partitioning method is that when X is a prime number, the method will not work and furthermore the Diophantine equation generated will be a reducible Diophantine equation and may be solvable.

Integer Partitioning using Relatively Prime Coordinates

Prime Sets and Prime Coordinates

Often in mathematics, numbers are described as belonging to the set of natural numbers {N} or {Z} integers. However, upon closer inspection of the properties of numbers, it is also possible to describe numbers as belonging to Prime Sets which will be denoted as $\{P_x\}$ in this disclosure.

Definition 1: Prime Sets

Let $\{P_x\}$ denote the set of natural numbers from $$\{1, 2, 3, 4 \ldots \prod_{n=1}^{n=x} P_n\}$$

where P is the series of prime numbers and $P_1=2$, $P_2=3$, $P_3=5$, $P_4=7$

For example $\{P_5\}$ will denote the set of natural numbers from 1 to 2310. (2310=2.3.5.7.11)

$\{P_6\}$ will denote the set of natural numbers from 1 to 30030 (30030=2.3.5.7.11.13)

Definition 2: Prime Coordinates

For any $\{P_x\}$ there will be x coordinates.

For any natural number $N \in \{P_x\}$ its coordinates are defined by: (N mod $P_1$, N mod $P_2$, N mod $P_3$ ... N mod $P_x$) where mod is the modulo operation, and N mod $P_1$ denotes the remainder of N divided by 2.

Proof 1: Proof by contradiction
Statement:
For any $\{P_x\}$ there are $$\prod_{n=1}^{n=x} P_n$$

unique coordinates and for any natural number $N \in \{P_x\}$ has unique prime coordinates.

Suppose there is $N_1 \in \{P_x\}$ and $N_2 \in \{P_x\}$ such that $N_1 \neq N_2$ and $N_1$ and $N_2$ have the same prime coordinates, i.e., $N_1$ mod $P_1 = N_2$ mod $P_1$
$N_1$ mod $P_2 = N_2$ mod $P_2$
$N_1$ mod $P_x = N_2$ mod $P_x$
Let $|N_1 - N_2| = N_3$
$N_3$ mod $P_1 = 0$, $N_3$ mod $P_2 = 0$ ... $N_3$ mod $P_x = 0$ the smallest non-zero integer divisible by 2,3,5,7 ... $P_x$ is 2.3.5.7.11.13 ... $P_x$.

$$\prod_{n=1}^{n=x} P_n \le N3, |N1-N2| < \prod_{n=1}^{n=x} P_n \quad \text{since } N_1 \in \{P_x\}, N_2 \in \{P_x\}$$

hence there is a contradiction, therefore each natural number $N \in \{P_x\}$ has unique prime coordinates.

The Prime Coordinates Function

A trivial example would be (1,1,1,1,1,1) which would denote the natural number 1 regardless of the number of coordinates.

(1,1,1,1,1,1)=(1,1,1,1,1,1,1,1,1,1)=(1,1,1,1,1,1,1,1,1,1,1,1,1,1,1,1,1)=1

Another trivial example would be:
(0,2)=(0,2,2,2,2,2,2,2)=(0,2,2,2,2,2,2,2,2,2,2,2,2,2,2,2,2)=2
since 1 mod $P_x=1$ for any prime number and 2 mod $P_x=2$ for any prime number greater than 2.

Representation of prime coordinate (1,2,3,4,5,6,) may be ascertained as follows. Using the function requires the solving of multiple Diophantine equations, in particular for the above example:

Let (1,2,3,4,5,6)=X
By definition of the function,
X mod 2=1
X mod 3=2
X mod 5=3
X mod 7=4
X mod 11=5
X mod 13=6

An integral solution for the following Diophantine equations has to be found.

Let $n_1, n_2, n_3, n_4, n_5, n_6$ be integers, $X = 2n_1 + 1$ $X = 3n_2 + 2$ $X = 5n_3 + 3$ $X = 7n_4 + 4$ $X = 11n_5 + 5$ $X = 13n_6 + 6$ Two problems naturally arise from the solving of Diophantine equations: (i) does an integral solution exist? (ii) How to derive an integral solution?

Proof 2:

Statement:

An integral solution exists for any set of linear Diophantine equations with 2 variables in the format if $k_1, k_2, k_3 \ldots$ are prime numbers.

$X = k_1 y + z_1, X = k_2 z + z_2, X = k_3 y + z_3$ where $k_1, k_2, k_3 \ldots$ and $z_1, z_2, z_3 \ldots$ are integers Proof 1 has shown that:

For any $\{P_x\}$ there are $$\prod_{n=1}^{n=x} P_n$$

unique coordinates and for any natural number $N \in \{P_x\}$ has unique prime coordinates.

Given the following 2 conditions, it can be proved by contradiction and pigeon hole principal:

(1) For any set $\{P_x\}$ there are exactly $$\prod_{n=1}^{n=x} P_n$$

natural numbers $$\prod_{n=1}^{n=x} P_n$$

and coordinates, (2) For any natural number $N \in \{P_x\}$, there exist unique coordinates Suppose there exists a prime coordinate function with x coordinates and set a of corresponding Diophantine equations with no integral solution, then there exists a maximum of $$\prod_{n=1}^{n=x} P_n - 1$$

coordinates when there are $$\prod_{n=1}^{n=x} P_n$$

natural numbers

This implies there exist one or more numbers $N \in \{P_x\}$ that has the same coordinates by the pigeon hole principal thus contradicting Proof 1.

Hence, the statement is true.

Solving for the Diophantine equations, the number 29243 is derived.

(1,2,3,4,5,6) = 29243

29243 mod 2 = 1

29243 mod 3 = 2

29243 mod 5 = 3

29243 mod 7 = 4

29243 mod 11 = 5

29243 mod 13 = 6

Prime Vectors

Representation of (1,0,0,0), (0,1,0,0), (0,0,1,0), (0,0,0,1) may be as follows.

In this case $\{P_4\}$ represents the set of natural numbers up to 210

(1,0,0,0) = 105

(0,1,0,0) = 70

(0,0,1,0) = 126

(0,0,0,1) = 120

Now then (1,2,3,4) = [105+2(70)+3(126)+4(120)] mod 210 = 1103 mod 210 = 53 The number 53 can be represented as (1,2,3,4,9) or (1,2,3,4,9,1), etc.

Determining Prime Vectors

For any prime vector coordinate (0,0,1) with x terms and 1 on the $Z^{th}$ coordinate, is equal to:

$$\prod_{n=1}^{n=x} \pi(P_n) \cdot (K_1)/P_z$$

where $K_1$ is any integral solution to x in the Diophantine equation $$\prod_{n=1}^{n=x} \pi(P_n)/P_z \bmod P_z \cdot x = (P_z) y + 1$$

For convenience of calculation, let $K_1$ be the smallest positive integral solution such that $0 < K_1$.

Example 4: Determine the Value of (0,0,1,0,0), $P_z=P_3=5$, X=5

$$\sum_{n=1}^{n=x} \pi(P_n)/P_z = 2\cdot 3\cdot 7\cdot 11 = 462$$

462 mod 5=2
The integral solution to the Diophantine equation $$2x=5y+1$$

will be x=3, y=1, let K=3

$$\sum_{n=1}^{n=x} \pi(P_n)\cdot(K_1)/P_z = 2\cdot 3\cdot 5\cdot 7\cdot 11\cdot(3/7) = 462\cdot 3 = 1386$$

Example 5: Determine the Value of (0,0,0,0,0,1), $P_z=P_7=17$, X=7

$$\sum_{n=1}^{n=x} \pi(P_n)/P_z = 2\cdot 3\cdot 5\cdot 7\cdot 11\cdot 13 = 30030$$

30030 mod 17=8
The integral solution to the Diophantine equation $$8x=17y+1$$

will be x=15, y=7, let $K_1$=15

$$\sum_{n=1}^{n=x} \pi(P_n)\cdot(K_1)/P_z = 2\cdot 3\cdot 5\cdot 7\cdot 11\cdot 13\cdot 17(15/17) = 30030(15) = 450450$$

Determining Prime Coordinates

Prime coordinates can be added, subtracted or multiplied with rules determined by the modulo operation.

For example, it has been determined from the above (0,0,0,0,0,1)=450450 Note that:

$$\sum_{n=1}^{n=x} \pi(P_n) = 2\cdot 3\cdot 5\cdot 7\cdot 11\cdot 13\cdot 17 = 510510$$

And for (0,0,0,0,0,0,2), (0,0,0,0,0,0,3)∈{$P_7$},
(0,0,0,0,0,0,2), (0,0,0,0,0,0,3)≤510510,
(0,0,0,0,0,0,2)=450450(2) mod 510510=900900 mod 510510=390390
(0,0,0,0,0,0,3)=450450(3) mod 510510=1351350 mod 510510=330330

Properties Of Prime Vectors

The properties of prime vectors are similar to the properties of the modulo operation (1) Associative $X_1$ mod n+$X_2$ mod n+$X_3$ mod n+$X_4$ mod n=$X_1$ mod n+($X_2$ mod n+$X_3$ mod n+$X_4$ mod n)

$X_1$ mod n·$X_2$ mod n·$X_3$ mod n·$X_4$ mod n=$X_1$ mod n·($X_2$ mod n·$X_3$ mod n·$X_4$ mod n)

(0,0,1)+(0,0,1)+(0,0,1)=[(0,0,1)+(0,0,1)]+(0,0,1)=(0,0,1)+[(0,0,1)+(0,0,1)]=(0,0,3)

(2) Distributive

3[(0,0,1)]=1[(0,0,1)]+2 [(0,0,1)]=(0,0,3)

(3) Commutative

3 [(0,0,1)]·1[(0,0,1)]=1[(0,0,1)]3 [(0,0,1)]=(0,0,3)

Variations of the Prime Coordinate System [Relatively Prime Coordinate System]

Generally, any set of relatively prime numbers can be used to form an alternative coordinate system. Proof 1 as illustrated will be true for the system and the properties will generally be the same.

Example 6

For an alternate coordinate system {30,7,11}, the 3 numbers are relatively prime (1,0,0)=1771
(0,1,0)=330
(0,0,1)=210
(1,2,3)=[1771+660+630] mod 2310=751

Note: 30.7.11 =2310 [There are 2310 different combinations of coordinates]

Example 7

For an alternate coordinate system {4,9,25}, the 3 numbers are relatively prime (1,0,0)=225
(0,1,0)=100
(0,0,1)=576
(1,2,3)=[225+200+1728] mod 900=353

Note: 4.9.25=900 [There are 900 different combinations of coordinates]

Key Generation, Encryption, Decryption

Key generation, encryption, and decryption are described herein, according to some embodiments of the invention.

Reference is made to FIG. 1 which is a simplified flow chart showing message exchanges among a key generation apparatus 20, an encryption apparatus 30, and a decryption apparatus 40.

In block 101, the key generation apparatus 20 receives a key generation request and generates a symmetric key.

In block 103, the key generation apparatus 20 sends the symmetric key and, optionally, at least one cryptography parameter to the encryption apparatus 30 by way of one or more transmissions. An example of cryptography parameter is cipher text dependent variable.

In block 105A, the encryption apparatus 30 receives the symmetric key and optionally, the at least one cryptography parameter.

In block 105B, the decryption apparatus 40 receives the symmetric key and optionally the at least one cryptography parameter, which may be received from the key generation apparatus 20 or the encryption apparatus 30.

In block 107, the encryption apparatus 30 receives a plain text message which includes at least one plain text. Using at least the symmetric key and, optionally, the at least one cryptography parameter, the encryption apparatus 30 encrypts the plain text message to provide or produce a cipher text message which includes at least one cipher text.

Further in block 107, the encryption apparatus 30 provides the cipher text message (i.e. at least one Diophantine equation) as electromagnetic, mechanical, and/or matter waves or signals.

In block 109, the encryption apparatus 30 sends the cipher text message, as electromagnetic, mechanical, and/or matter waves or signals, to a decryption apparatus 40 directly or indirectly.

In block 111, the decryption apparatus 40 receives electromagnetic, mechanical, and/or matter waves or signals. Using at least the received electromagnetic, mechanical, and/or matter waves, the decryption apparatus 40 constructs at least one Diophantine equation as a received cipher text message. Using the symmetric key and, optionally, the at least one cryptography parameter and possibly other parameters, the decryption apparatus 40 decrypts the cipher text message to provide or produce a plain text message which is necessarily equivalent to the plain text message in block 107.

In optional block 113, if a cryptography parameter is changed, the encryption apparatus 30 sends the changed or updated cryptography parameter to the key generation apparatus 20 and/or the decryption apparatus 40.

In optional block 115, the key generation apparatus 20 may receive the changed or updated cryptography parameter which may be used in subsequent key generation. The change or update may be ascertained from the cipher text produced in block 107.

In optional block 117, the decryption apparatus 40 may receive the updated cryptography parameter and may use the updated cryptography parameter in subsequent decryption.

It is to be appreciated that a sender apparatus may be communicably coupled to or include the encryption apparatus 30 and may provide the plain text message to the encryption apparatus 30. A receiver apparatus may be communicably coupled to or include the decryption apparatus 40 and may provide the symmetric key to the decryption apparatus 40. The key generation apparatus 20 may receive the key generation command from the encryption apparatus 30 or other apparatus.

Key Generation

Figure 2A:
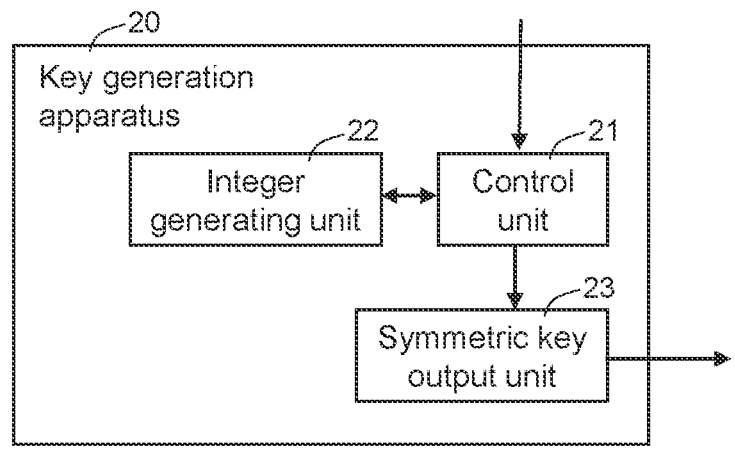
FIG. 2A is a schematic representation of a key generation apparatus.
Figure 2B:
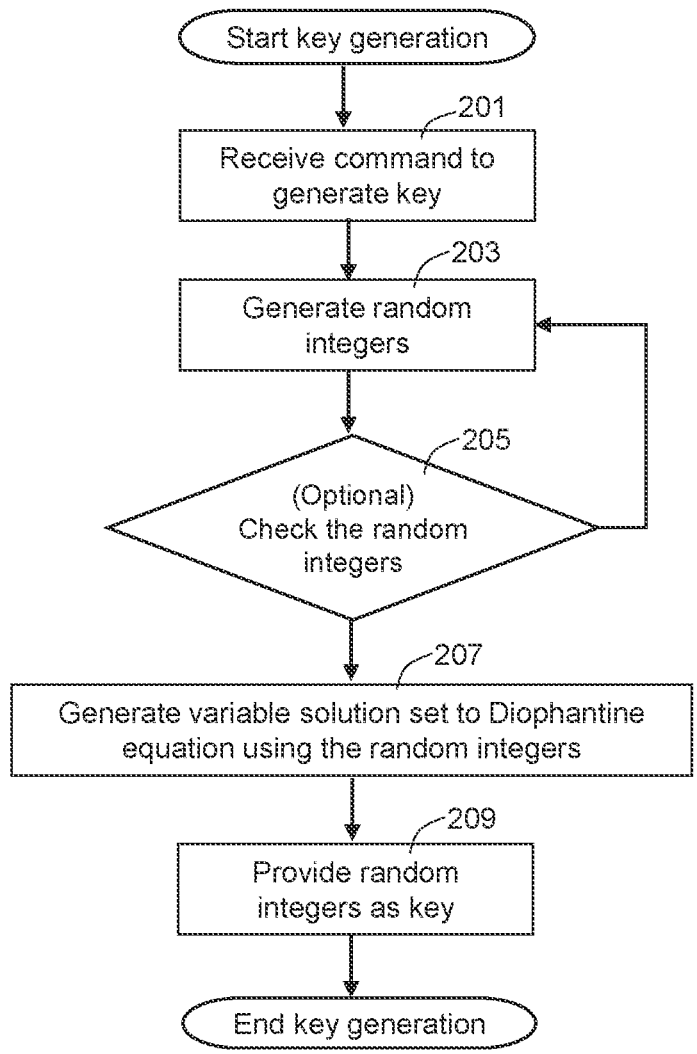
FIG. 2B is a simplified flow chart showing a key generation method.

Reference is made to FIG. 2A and 2B, according to some embodiments of the invention.

FIG. 2A is a schematic representation of a key generation apparatus 20 which may comprise a control unit 21, an integer generating unit 22 communicably coupled thereto, and a symmetric key output unit 23 communicably coupled to the control unit 21. The control unit 21 may be configured to receive key generation command. The symmetric key output unit 23 may be configured to send or provide a symmetric key to another apparatus.

FIG. 2B is a flow chart showing a key generation method which may be performed by the key generation apparatus 20 or other suitable key generation apparatus.

In block 201, a key generation apparatus 20, e.g. control unit 21 or integer generating unit 22, receives a key generation command.

In block 203, in response to the key generation which may be provided by the control unit 21 to the integer generating unit 22, the key generation apparatus 20, e.g. integer generating unit 22, generates a plurality of integers, e.g. random integers, which may be generated according to a predetermined algorithm, and provides the integers to the control unit 21. Alternatively, the integers may be predefined. Block 203 may proceed to block 207 (i.e. bypass block 205) or to block 205.

In optional block 205, the key generation apparatus 20, e.g. control unit 21, may check the generated integers for compliance with a predetermined key parameter. For example, the generated integers may be ascertained whether they are within or exceed a value limit. If the predetermined key parameter is complied with, block 205 proceeds to block 207; otherwise, block 205 returns to block 203 if the predetermined key parameter is not complied with and replacement integers are generated and checked for compliance.

In block 207, using the generated integers from block 203, the key generation apparatus 20, e.g. control unit 21, generates at least one variable solution ($v_1, \ldots, v_n$) set which is configured to solve Diophantine equation(s).

In block 209, the generated integers and variable solution set ($v_1, \ldots, v_n$) may be provided or output by the control unit 21 to the symmetric key output unit 23. The symmetric key output unit 23 may send or provide the symmetric key and/or the at least one variable solution set ($v_1, \ldots, v_n$) to the encryption apparatus 30, decryption apparatus 40 and/or other apparatus.

Encryption

Figure 3A:
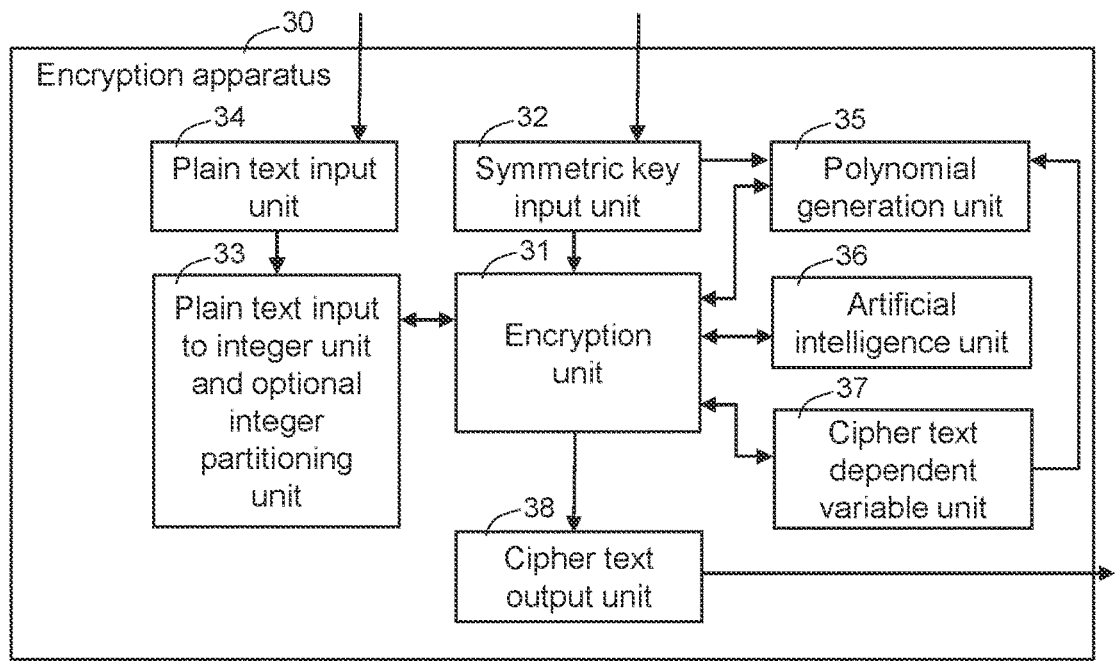
FIG. 3A is a schematic representation of an encryption apparatus.
Figure 3B:
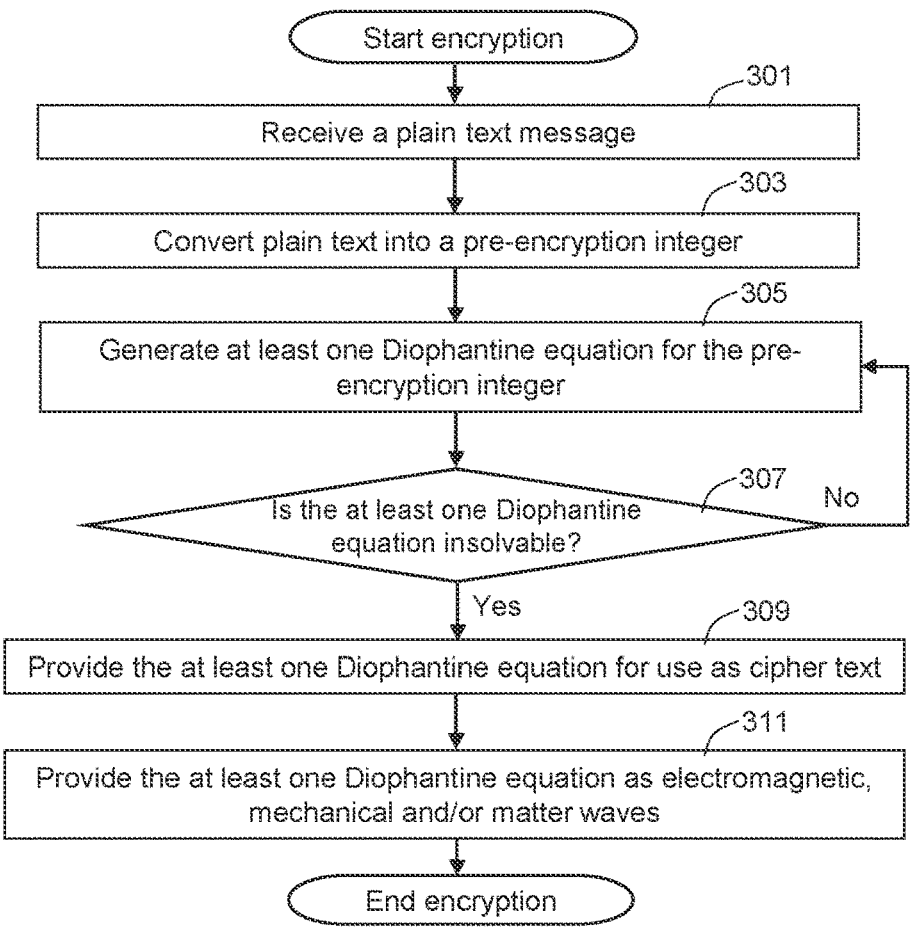
FIG. 3B is a simplified flow chart showing an encryption method.

Reference is made to FIG. 3A and 3B, according to some embodiments of the invention.

FIG. 3A is a schematic representation of an encryption apparatus 30 which may comprise an encryption unit 31 which may be communicably coupled to symmetric key input unit 32 (which may be configured to receive at least one symmetric key from the encryption unit 31), plain text to integer unit 33 (which may be configured to receive at least one pre-encrypted integer ($M_1, \ldots, M_n$) from the plain text input unit 34), polynomial generation unit 35 (which may be configured to receive at least one symmetric key from the symmetric key input unit 32 or encryption unit 31 and provide at least one variable solution set ($v_1, \ldots, v_n$) to the encryption unit 31), artificial intelligence (AI) unit 36 (which may be configured to receive at least one Diophantine equation from encryption unit 31 and provide a prediction of insolvability or solvability of Diophantine equation(s) to the encryption unit 31), optional cipher text dependent variable unit 37 (which may be configured to receive at least one Diophantine equation from the encryption unit 31 and provide a cipher text variable to the encryption unit 31), and cipher text output unit 38 (which may be configured to receive cipher text being at least one Diophantine equation from the encryption unit 31, ascertain a plurality of electromagnetic, mechanical, and/or matter waves which describe the at least one Diophantine equation, and send the cipher text as electromagnetic, mechanical, and/or matter waves to a decryption apparatus 40 directly or indirectly). The plain text to integer unit 33 may include an optional integer partitioning unit (which may be configured to receive prime integers from the symmetric key input unit 32 directly or indirectly through the encryption unit 31, and provide partitioned integers to the encryption unit 31) and may be communicably coupled to plain text input unit 34. The plain text input unit 34 may be configured to receive at least one plain text from another apparatus and provide the received plain text to the plain text to integer unit 33. The symmetric key input unit 32 may be configured to receive at least one symmetric key from another apparatus and provide the received symmetric key to the encryption unit 31 and optionally polynomial generation unit 35).

FIG. 3B is a flow chart showing an encryption method which may be performed by the encryption apparatus 30 or other suitable encryption apparatus.

In block 301, the encryption apparatus 30, e.g. symmetric key input unit 32, receives at least one symmetric key. The encryption apparatus 30, e.g. plain text input unit 34, receives a plain text message which includes at least one plain text, and sends the plain text message to the plain text to integer unit 33. It is to be appreciated that the receipt of the symmetric key and the plain text message may occur at different times or sequence.

In block 303, the encryption apparatus 30, e.g. plain text to integer unit 33, converts the at least one plain text to at least one pre-encryption integer ($M_1, \ldots, M_n$).

In block 305, using at least the at least one symmetric key and the at least one pre-encryption integer ($M_1, \ldots, M_n$), the encryption apparatus, e.g. encryption unit 31, generates at least one Diophantine equation which will be provided as a cipher text message which includes at least one cipher text. Block 305 may be implemented by one of possible method examples described below.

In an example (basic), using the at least one symmetric key, the encryption apparatus 30, e.g. polynomial generation unit 35, may generate at least one variable solution set ($v_1, \ldots, v_n$) for producing at least one Diophantine equation solvable therewith. Each variable may be derived from at least one integer of the at least one symmetric key. Using the generated variable solution set ($v_1, \ldots, v_n$) and the at least one pre-encryption integer ($M_1, \ldots, M_n$), the encryption apparatus 30, e.g. encryption unit 31, may generate at least one Diophantine equation which is solvable by the at least one variable solution set ($v_1, \ldots, v_n$).

In another example (involving faux Diophantine equation), using the at least one symmetric key, the encryption apparatus 30, e.g. polynomial generation unit 35, may generate at least one variable solution set ($v_1, \ldots, v_n$) for producing at least one Diophantine equation and at least one faux Diophantine equation. Each variable may be derived from at least one integer of the at least one symmetric key. Using the generated variable solution set ($v_1, \ldots, v_n$) and the at least one pre-encryption integer ($M_1, \ldots, M_n$), the encryption apparatus, e.g. encryption unit 31, may generate at least one Diophantine equation which is solvable by the at least one variable solution set ($v_1, \ldots, v_n$), and at least one faux Diophantine equation. A solution for each faux Diophantine equation is ascertained, e.g. by the encryption unit 31 or a faux equation evaluation or other unit (not shown) communicably coupled thereto, for compliance with a predetermined faux Diophantine equation condition. If the solution is ascertained as a non-integer, the faux Diophantine equation will be provided as faux cipher text. If the solution is ascertained as an integer, the faux Diophantine equation will not be provided as cipher text; instead, a replacement faux Diophantine equation will be generated, e.g. by the encryption unit 31, and its solution ascertained for compliance in a similar manner.

In yet another example (involving cipher text dependent variable), using the at least one symmetric key and a cipher text dependent variable, e.g. provided by the cipher text dependent variable unit 37, the encryption apparatus 30, e.g. polynomial generation unit 35, may generate at least one variable solution set ($v_1, \ldots, v_n$) for producing at least one Diophantine equation solvable therewith. Each variable may be derived from at least one integer of the at least one symmetric key and the cipher text dependent variable. Using the generated variable solution set ($v_1, \ldots, v_n$), the encryption apparatus 30, e.g. encryption unit 31, may generate at least one Diophantine equation which is solvable by the at least one variable solution set ($v_1, \ldots, v_n$). The cipher text dependent variable may be initially set at a predetermined value, e.g. random value, and subsequently changed or updated depending on the cipher text generated. For example, the cipher text dependent variable may be based on a coefficient of a variable , ($v_1, \ldots, v_n$) in a Diophantine equation of a previous cipher text, wherein the variable or ($v_1, \ldots, v_n$) in the Diophantine equation of the previous cipher text includes a polynomial degree based on a previous cipher text dependent variable.

In a further example (involving concealment variable), using the at least one symmetric key, the encryption apparatus 30, e.g. polynomial generation apparatus 35, may generate at least one variable solution set ($v_1, \ldots, v_n$) for producing at least one Diophantine equation solvable therewith. Each variable may be derived from at least one integer of the at least one symmetric key. Using at least some variables of the generated variable solution set ($v_1, \ldots, v_n$) (or a first subset thereof) and the at least one pre-encryption integer ($M_1, \ldots, M_n$), the encryption apparatus 30, e.g. encryption unit 31, may generate at least one initial Diophantine equation. Using at least one concealment variable derived from at least one variable of the variable solution set ($v_1, \ldots, v_n$) (or a second subset thereof), the encryption apparatus 30, e.g. encryption unit 31, may modify the at least one initial Diophantine equation to generate the at least one Diophantine equation which is solvable by the at least one variable solution set ($v_1, \ldots, v_n$). Such modification may include performing addition, subtraction, multiplication, and/or division on the at least one initial Diophantine equation with the concealment variable or its derivation. The first subset and the second subset may include mutually exclusive variables or may include common variable(s).

In a yet further example (involving integer partitioning), using the at least one symmetric key, the encryption apparatus 30, e.g. polynomial generation unit 35, may generate at least one variable solution set ($v_1, \ldots, v_n$) for producing at least one Diophantine equation ($v_1, \ldots, v_n$) solvable therewith. Each variable may be derived from at least one integer of the at least one symmetric key and the cipher text dependent variable. Based on a plurality of relatively prime integers, e.g. provided by the symmetric key input unit 32, the encryption apparatus, e.g. the optional integer partitioning unit, partitions the pre-encryption integer ($M_1, \ldots, M_n$) into a plurality of partitioned integers. The number or count of Diophantine equations may be equivalent to a count of the relatively prime integers as well as a count of the partitioned integers. Partitioning the at least one pre-encryption integer ($M_1, \ldots, M_n$) may include performing a plurality of modulo operations using the at least one pre-encryption integer ($M_1, \ldots, M_n$), and the relatively prime integers being a plurality of divisors, and deriving therefrom the partitioned integers being a plurality of remainders.

In a yet another further example (involving cipher text dependent variable, concealment variable, and integer partitioning), using the at least one symmetric key and a cipher text dependent variable, the encryption apparatus 30, e.g. polynomial generation unit 35, may generate at least one variable solution set ($v_1, \ldots, v_n$) for producing at least one Diophantine equation ($v_1, \ldots, v_n$) solvable therewith. Each variable may be derived from at least one integer of the at least one symmetric key and the cipher text dependent variable. Based on a plurality of relatively prime integers, e.g. provided by the symmetric key input unit 32, the encryption apparatus, e.g. the optional integer partitioning unit, partitions the at least one pre-encryption integer ($M_1$, .

..., $M_n$) into a plurality of partitioned integers. Using at least some variables of the variable solution set ($v_1, \ldots, v_n$) (or a first subset thereof) and the partitioned integers, the encryption apparatus 30, e.g. encryption unit 31, may generate a plurality of initial Diophantine equations. Using a concealment variable derived from at least one variable of the variable solution set ($v_1, \ldots, v_n$) (or a second subset thereof), the encryption apparatus, e.g. encryption unit 31, may modify the initial Diophantine equations to generate a plurality of Diophantine equations which are solvable by the at least one variable solution set ($v_1, \ldots, v_n$). The number or count of Diophantine equations may be equivalent to a count of the relatively prime integers as well as a count of the partitioned integers. The cipher text dependent variable and the concealment variable may be ascertained in a similar manner as described in the preceding examples. Partitioning the at least one pre-encryption integer ($M_1, \ldots, M_n$) may include performing a plurality of modulo operations using the at least one pre-encryption integer ($M_1, \ldots, M_n$), and the relatively prime integers being a plurality of divisors, and deriving therefrom the partitioned integers being a plurality of remainders.

In block 307, the encryption apparatus 30, e.g. AI unit 36, predicts, using a trained AI model which may comprise a prediction algorithm, insolvability or solvability of the at least one Diophantine equation produced in block 305, including any faux Diophantine equation(s). If the at least one Diophantine equation, including any faux Diophantine equation, is predicted as insolvable, the at least one Diophantine equation will be provided or output as cipher text. On the other hand, if any Diophantine equation, including any faux Diophantine equation, is predicted as solvable, the flow chart returns to block 305 where at least one replacement Diophantine equation is produced and its insolvability or solvability is predicted in block 307. If the at least one replacement Diophantine equation is predicted as insolvable, this replacement Diophantine equation(s) as well as a subset of the at least one Diophantine equation which is predicted as insolvable will be provided or output as cipher text.

In block 309, based on the AI prediction of insolvability or solvability of the at least one Diophantine equation in block 307, the encryption apparatus 30, e.g. cipher text output unit 38, provides or outputs at least one insolvable Diophantine equation, including any replacement or faux Diophantine equation(s) which insolvability is predicted, as a cipher text message which includes at least one cipher text.

In block 311, the encryption apparatus 30, e.g. wave provision unit 39 which may be included in the cipher text output unit 38 or may be a distinct unit communicably coupled to the cipher text output unit 38, ascertains a plurality of electromagnetic, mechanical, and/or matter waves which describe the at least one Diophantine equation. The plurality of electromagnetic, mechanical, and/or matter waves may include replacement and/or faux electromagnetic, mechanical, and/or matter waves, if any. The cipher text in the form of the ascertained electromagnetic, mechanical, and/or matter waves may be sent or transmitted to a decryption apparatus 40 or other apparatus.

In the example (involving at least one faux Diophantine equation), the at least one faux Diophantine equation, which complies with the predetermined faux Diophantine equation condition, is provided or output as a faux cipher text message which includes at least one faux cipher text. The faux cipher text message and the cipher text message may be sent or provide, e.g. by cipher text output unit 38, to a decryption apparatus 40 or other apparatus at a predetermined or random interval.

Artificial Intelligence

Figure 3C:
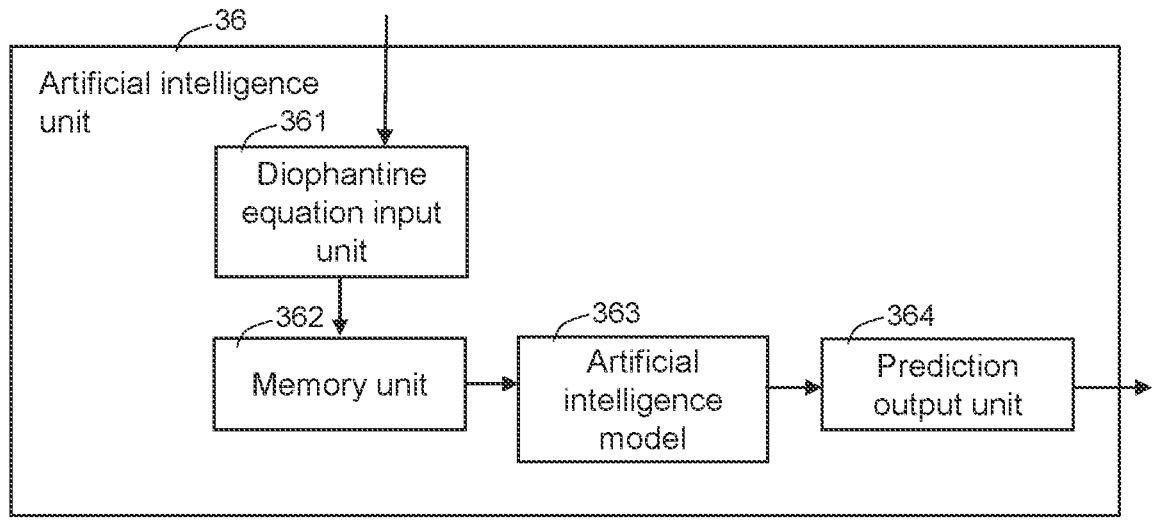
FIG. 3C is a schematic representation of an artificial intelligence (AI) unit.
Figure 3D:
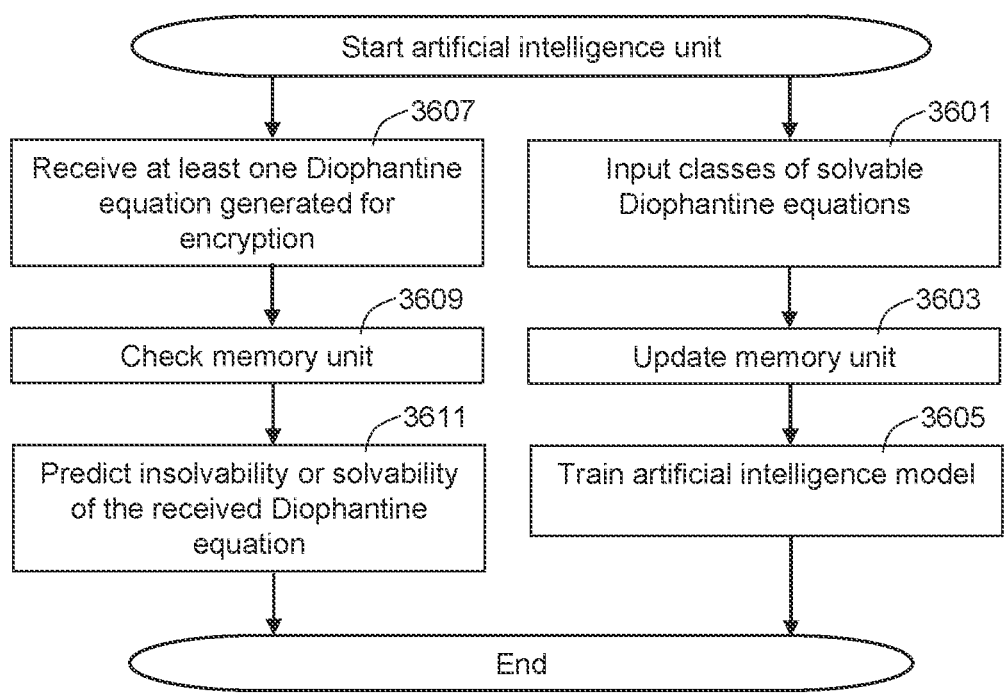
FIG. 3D is a simplified flow chart showing an AI training and/or prediction method.

Reference is made to FIG. 3C and 3D, according to some embodiments of the invention.

FIG. 3C is a schematic representation of an artificial intelligence (AI) unit 36 which may be employed by the encryption apparatus 30. The AI unit 36 may comprise a Diophantine equation input unit 361, a memory unit 362 communicably coupled thereto, a trained AI model 363 communicably coupled thereto, a prediction output unit 364 communicably coupled thereto. The trained AI model 363 may comprise a prediction algorithm or equivalent which is configured to predict insolvability or solvability of a Diophantine equation.

FIG. 3D includes a flow chart of an AI training method which may be performed by the AI unit 36 or other suitable AI apparatus.

In block 3601, the AI unit 36, e.g. Diophantine equation input unit 361, receives classes or examples of Diophantine equations which are solvable.

In block 3603, the AI unit 36, e.g. memory unit 362, stores the received classes or examples of solvable Diophantine equations.

In block 3605, the AI unit 36, e.g. AI model 363 which may comprise a prediction algorithm, is trained using the solvable Diophantine equations provided by the memory unit 362.

FIG. 3D includes a flow chart of an AI prediction method which may be performed by the AI unit 36 or other suitable AI apparatus.

In block 3607, the AI unit 36, e.g. Diophantine equation input unit 361, receives at least one Diophantine equation which is generated in block 305 to be used as cipher text.

In block 3609, using the classes or examples of solvable Diophantine equations which may be stored in the memory unit 362 or other memory unit, the AI unit 36, e.g. trained AI model 363, predicts whether the received Diophantine equation to be used as cipher text is insolvable or solvable.

In block 3611, using the prediction from block 3609, the AI unit 36, e.g. prediction output unit 364, provides or outputs the prediction, e.g. insolvability or solvability of the received Diophantine equation to be used as cipher text. The prediction may be sent to the encryption unit 31 to be considered in the above-described block 307.

Figure 3E:
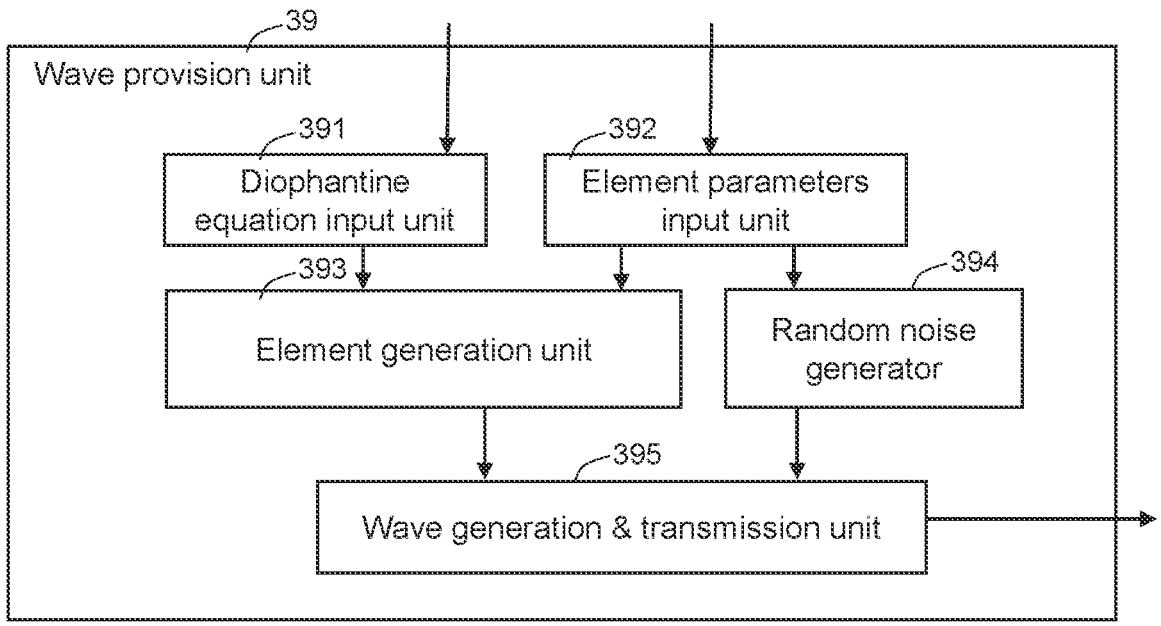
FIG. 3E is a schematic representation of a wave provision unit.
Figure 3F:
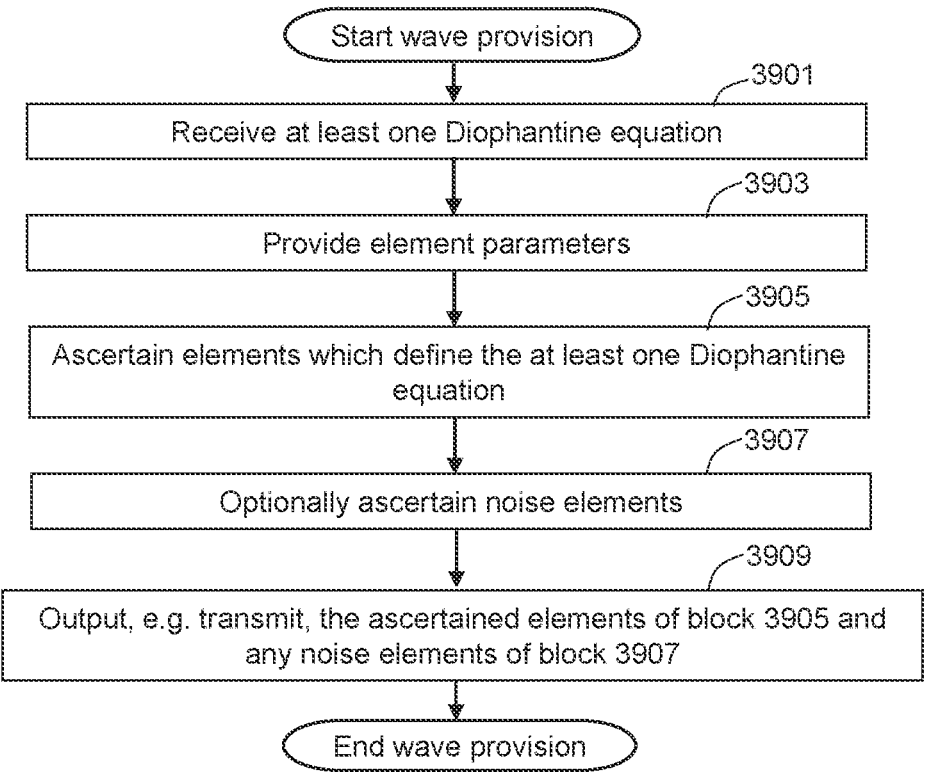
FIG. 3F is a simplified flow chart showing a wave provision method.

Provision of Diophantine Equations as Electromagnetic, mechanical, and/or matter Waves or Signals Reference is made to FIGS. 3E and 3F, according to some embodiments of the invention.

FIG. 3E is a schematic representation of a wave provision unit 39 which may be included in the cipher text output unit 38 or distinct therefrom and/or may be considered comprised in the encryption apparatus 30. The wave provision unit 39 may comprise a Diophantine equation input unit 391, an element parameters input unit 392, an element generation unit 393 which is communicably coupled to the Diophantine equation input unit 391 and the element parameters input unit 392, an optional random noise generator 394 which is communicably coupled to the element parameters input unit 392, and a wave/signal generation & transmission unit 395 which is communicably coupled to the element generation unit 393 and the optional random noise generator 394. It is to be appreciated that, in an embodiment, the wave/signal generation & transmission unit 395 may be provided as distinct wave/signal generation unit and wave/signal transmission unit.

The phrase "wave provision unit" may generally refer to any device which is configured to at least produce electromagnetic, mechanical and/or matter waves; it may additionally be configured to transmit or communicate the produced waves. Accordingly, it is to be appreciated that the phrase "wave provision unit" may be interchangeable with "wave generation unit" and "wave transmission unit".

FIG. 3F includes a flow chart of a wave provision method which may be performed by the wave provision unit 39 or other suitable wave provision unit. The phrase "wave provision method" may generally refer to any method for producing electromagnetic, mechanical and/or matter waves; it may additionally include transmitting or communicating the produced waves. Accordingly, it is to be appreciated that the phrase "wave provision method" may be interchangeable with "wave generation method" and "wave transmission method".

In block 3901, the wave provision unit 39, e.g. Diophantine equation input unit 391, receives Diophantine equation(s) such as from the cipher text output unit 38 of the encryption apparatus 30.

In block 3903, the wave provision unit 39, e.g. element parameter input unit 392 receives element parameters according to the selected electromagnetic, mechanical, and/or matter waves to be employed for transmission.

In block 3905, using the Diophantine equation(s) of block 3901 and the element parameters of block 3903, the wave provision unit 39, e.g. element generation unit 393, ascertains, e.g. generates, a plurality of elements which define the Diophantine equation(s), including replacement elements for any replacement Diophantine equation and/or faux elements for any faux Diophantine equations.

In block 3907, optionally, using the element parameters of block 3903, the wave provision unit 39, e.g. random noise generator 394, ascertains, e.g. generates, noise elements.

In block 3909, using the elements ascertained in block 3905 and any noise elements ascertained in block 3907, the wave provision unit 39, e.g. wave/signal generation & transmission unit 395, ascertains electromagnetic, mechanical, and/or matter waves which define the Diophantine equation(s) and any noise elements. The ascertained electromagnetic, mechanical, and/or matter waves may include replacement and/or faux electromagnetic, mechanical, and/or matter waves. The wave provision unit 39, e.g. wave/signal generation & transmission unit 395, outputs the ascertained electromagnetic, mechanical, and/or matter waves, e.g. transmits the electromagnetic, mechanical, and/or matter waves directly or indirectly to a decryption apparatus 40.

Element Parameters

The utilisation of element parameters is to create a system of communication that can utilise wave characteristics to efficiently describe any Diophantine equation. In implementing such communication system, initially, a system of elements is formulated and, subsequently, these formulated elements are attributed to wave characteristics. Examples ways in which Diophantine equations can be expressed are below:

Example [English Language 26 Alphabets without use of numbers]

The following equation $v_0^5 = v_1^5 + v_2^5$ can be described in English as:

The first variable to the power of five is equal to the summation of the second variable to the power of five and the third variable to the power of five. However using the English language without numbers is an inefficient transmission method of describing Diophantine equations in terms of the number of characters.

Example [Element Parameters—Mathematical Notation with Alphabets]

$v_0^5 = v_1^5 + v_2^5$ can be expressed as $a^5 = b^5 + c^5$

While there are numerous ways that Diophantine equations can expressed and many element parameterisation methods, in general it would be efficient to utilise an element parameterisation that require the least number of wave characteristics to describe a Diophantine equation.

Examples of wave characteristic include, but are not limited to, frequency, amplitude, phase, wavelength, and speed.

The construction of the element parameters is itself a non-trivial process but the problem is not entirely constricted towards Diophantine equations. For example an equivalent problem in the English language will be to find the shortest sentence to convey a particular idea.

Currently, without utilising the element parameters, a Diophantine equation is typically transmitted and received via binary code using ASCII. The usage of element parameters to describe Diophantine equations will allow the transmission of Diophantine equations without using binary code and the ASCII. Depending on the element parameters chosen, it is possible to improve the energy efficiency and data transmission efficiency of devices transmitting and receiving Diophantine equations.

For each element parameter, a parameterisation system includes multiple components which define multiple aspects of a Diophantine equation: (i) start, (ii) end, (ii) numeral(s), (iii) mathematical operator(s), (iv) variable(s). The parameterisation system may include two distinct elements to denote start and end of a Diophantine equation, ten distinct elements to denote numerals from 0 to 9, five distinct elements to denote mathematical operators "=", "+", "−", "*", and power "^" , and one distinct element to denote a variable. Accordingly, there would be eighteen elements in the aforementioned parameterisation system. It is to be appreciated that other parameterisation systems may include a different count of elements.

The parameterisation system may prescribe certain rules, such as but not limited to: (i) a number without an operator before a variable denotes a coefficient of the variable, (ii) a number after a variable denotes an $n^{th}$ term variable, (iii) all variables must have a coefficient and term number, but for variables with unspecified coefficient, the default is 1, (iv) an element is considered activated when a frequency is detected regardless of other wave properties.

Examples of parameterisation systems include: sound waves with the equal temperament scale—"Keyboard Element Parameters"; microwaves with cosmic microwave background—"Region Element Parameters" [Frequency Hopping], and radio waves in Bluetooth frequency bands—"Bluetooth Element Parameters". More details of these examples will be provided in the later part of this description.

These examples show a one-to-one mapping of the Diophantine equation element parameters to a particular wave characteristic directly. This mapping is different from the usage of binary code to transmit Diophantine equations, whereby each binary code 0 or 1 is attributed to a particular wave characteristic.

Universal Diophantine Equations

There are various mathematical methods to map the solution of a Diophantine equation to another Diophantine equation with varied number of variables and varied degree of equation.

For Example $(a_1^2+a_2^2+a_3^2+a_4^2)^2=(b_1^2+b_2^2+b_3^2+b_4^2)^2+(c_1^2+C_2^2+c_3^2c_4^2)^2$ can be rephrased, using Lagrange's four square theorem, by substitution $$a=a_1^2+a_2^2+a_3^2+a_4^2$$

$$b=b_1^2+b_2^2+b_3^2+b_4^2$$

$$c=c_1^2+c_2^2+c_3^2+c_4^2$$

The following equation can be derived: $a^2=b^2+c^2$

Hence, the solution to a Diophantine equation with 12 variables and degree 4 can be expressed as a solution to a Diophantine equation with 3 variables and degree 2 such that the original Diophantine equation with 12 variables and degree 4 has a solution if and only if the derived Diophantine equation with 3 variables and degree 2 has a solution.

Universal Diophantine equations are a class of Diophantine equations with degree D and X variables such that solving any arbitrary parametric Diophantine equation can be reduced to a class of universal Diophantine equation with fixed degree and fixed number of variables.

A detailed proof and the existence of universal Diophantine equations are published by J.P Jones (The Journal of Symbolic Logic, September 1982, Vol. 47, No. 3 pp 549-571 published by: Association for Symbolic Logic).

The following pairs (D,X) are known classes of universal Diophantine equations:

(4, 58), (8, 38), (12, 32), (20, 28), (24, 26), (28, 25), (96, 21), (2668, 19), $(2*10^5, 14)$, $(1.3*10^{44}, 12)$, $(4.6*10^{44}, 11)$, $(8.6*10^{44},10)$

The existence of universal Diophantine equations and mathematical methods that can map solutions of Diophantine equations provides extra rationality to the construction and search for element parameters that can most efficiently describe Diophantine equations.

Decryption

Figure 4A:
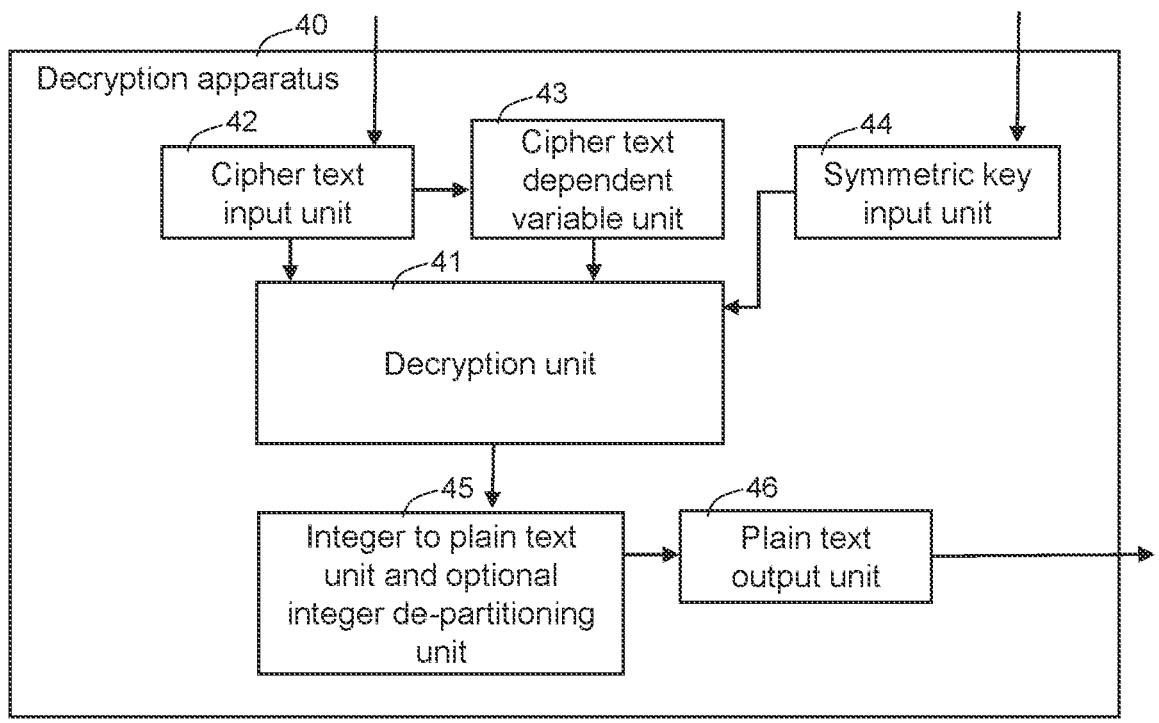
FIG. 4A is a schematic representation of a decryption apparatus.
Figure 4B:
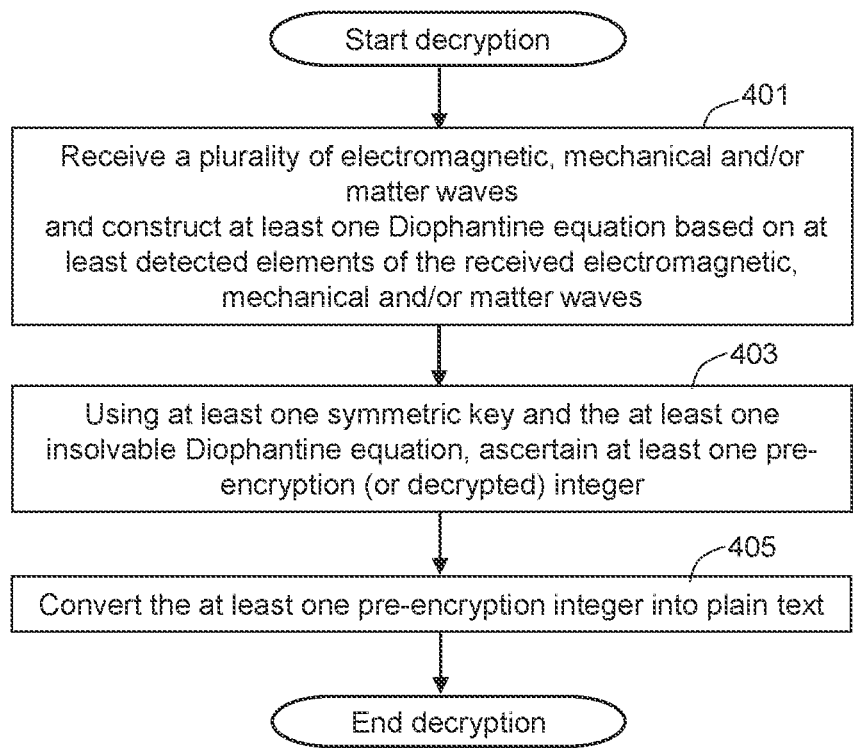
FIG. 4B is a simplified flow chart showing a decryption method.

Reference is made to FIG. 4A and 4B, according to some embodiments of the invention.

FIG. 4A is a schematic representation of a decryption apparatus 40 which may comprise a decryption unit 41 which is communicably coupled to a cipher text input unit 42 (which may be configured to receive a plurality of electromagnetic, mechanical, and/or matter waves as cipher text from another apparatus, construct at least one Diophantine equation from the received electromagnetic, mechanical, and/or matter waves, and provide the at least one Diophantine equation as cipher text to the decryption unit 41), an optional cipher text dependent variable unit 43 (which may be configured to provide cipher text dependent variable to the decryption unit 41), a symmetric key input unit 44 (which may be configured to receive symmetric key from another apparatus and provide the symmetric key to the decryption unit 41), and an integer to plain text unit 45 (which may be configured to receive integer from the decryption unit 41 and provide plain text to a plain text output unit 46). The integer to plain text unit 45 may be communicably coupled to the plain text output unit 46 and may include an optional integer de-partitioning unit which may be configured to de-partition integers and provide the de-partitioned integer(s) to the plain text output unit 46. The optional cipher text dependent variable unit 43 may be communicably coupled to the cipher text input unit 42. The optional cipher text dependent variable unit 43 may receive an initial value of cipher text dependent variable from a key generation apparatus 20 and thereafter receive a subsequent or updated value of cipher text dependent variable from the cipher text input unit 42 or ascertain the subsequent or updated value of cipher text dependent variable based on cipher text received from cipher text input unit 42.

FIG. 4B is a flow chart showing a decryption method which may be performed by the decryption apparatus 40 or other suitable decryption apparatus.

In block 401, the decryption apparatus 40, e.g. symmetric key input unit 44, receives a symmetric key. The decryption apparatus 40, e.g. wave receiver unit 41 which may be included in the cipher text input unit 42 or may be a distinct unit communicably coupled to the cipher text input unit 42, receives a plurality of electromagnetic, mechanical, and/or matter waves, and constructs at least one Diophantine equation based on at least characteristics, e.g. frequency, of the received electromagnetic, mechanical, and/or matter waves. The received electromagnetic, mechanical, and/or matter waves may include replacement and/or faux electromagnetic, mechanical, and/or matter waves, if any. It is to be appreciated that the receipt of the symmetric key and the cipher message may occur at different times or sequence. The cipher text may include at least one Diophantine equation which is insolvable and may include at least one faux Diophantine equation which will be identified in block 405.

In block 405, using at least the at least one symmetric key and the at least one cipher text, the decryption apparatus 40, e.g. decryption unit 41, solves the at least one Diophantine equation to ascertain or obtain at least one pre-encrypted or decrypted integer $(M_1, \ldots, M_n)$. Block 405 may be implemented by one of possible method examples described below.

In an example, using the at least one symmetric key, the decryption apparatus 40, e.g. decryption unit 41, may generate at least one variable solution set $(v_1, \ldots, v_n)$ for solving or decrypting the at least one Diophantine equation. Each variable may be derived from at least one integer of the at least one symmetric key. Using the generated variable solution set $(v_1, \ldots, v_n)$, the decryption apparatus 40, e.g. decryption unit 41, solves the at least one Diophantine equation to ascertain at least one pre-encrypted or decrypted integer $(M_1, \ldots, M_n)$, and thereafter provides the pre-encrypted integer $(M_1, \ldots, M_n)$ to the integer to plain text unit 45.

In another example (involving faux Diophantine equation), using the at least one symmetric key, the decryption apparatus 40, e.g. decryption unit 41, may generate at least one variable solution set $(v_1, \ldots, v_n)$ for solving or decrypting the at least one Diophantine equation. Each variable may be derived from at least one integer of the at least one symmetric key. Using the generated variable solution set $(v_1, \ldots, v_n)$, the decryption apparatus 40, e.g. decryption unit 41, solves the at least one Diophantine equation i.e. a plurality of Diophantine equations, and to ascertain at least one pre-encrypted or decrypted integer $(M_1, \ldots, M_n)$, and thereafter provides the at least one pre-encrypted integer $(M_1, \ldots, M_n)$ to the integer to plain text unit 45. If solving any of the at least one Diophantine equation produces a non-integer solution, the particular Diophantine equation is ascertained as a faux Diophantine equation and hence its non-integer solution will not be provided to the integer to plain text unit 45. Only integer solution(s) $(M_1, \ldots, M_n)$ will be provided to the integer to plain text unit 45.

In yet another example (involving cipher text dependent variable), using the at least one symmetric key and a cipher text dependent variable, e.g. provided by the cipher text dependent variable input unit 43, the decryption apparatus 40, e.g. decryption unit 41, may generate at least one variable solution set $(v_1, \ldots, v_n)$ for solving or decrypting the at least one Diophantine equation. Each variable may be derived from at least one integer of the at least one symmetric key and the cipher text dependent variable. Using the generated variable solution set $(v_1, \ldots, v_n)$, the decryption apparatus 40, e.g. decryption unit 41, solves the at least one Diophantine equation to ascertain at least one pre-encrypted or decrypted integer, and thereafter provides the pre-encrypted integer to the integer to plain text unit 45.

In a further example (involving concealment variable), using the at least one symmetric key, the decryption apparatus 40, e.g. decryption unit 41, may generate at least one variable solution set $(v_1, \ldots, v_n)$ for solving or decrypting the at least one Diophantine equation. Each variable may be derived from at least one integer of the at least one symmetric key. Using at least some variables of the generated variable solution set $(v_1, \ldots, v_n)$ (or a first subset thereof) and a concealment variable (or a second subset of the generated variable solution set $(v_1, \ldots, v_n)$), the decryption apparatus 40, e.g. decryption unit 41, solves the at least one Diophantine equation, including modifying the at least one Diophantine equation or its derivative by the concealment variable, to ascertain a pre-encrypted or decrypted integer $(M_1, \ldots, M_n)$ which is then provided to the integer to plain text unit 45. The concealment variable may be derived from at least one variable of the generated variable solution set $(v_1, \ldots, v_n)$ (or a second subset thereof). Such modification may include performing addition, subtraction, multiplication, and/or division, using the concealment variable, on the at least one Diophantine equation or its derivative in a manner to compensate for or negate the modification performed during encryption using the concealment variable. The first subset and the second subset may include mutually exclusive variables or may include common variable(s).

In another further example (involving integer partitioning), using the at least one symmetric key, the decryption apparatus 40, e.g. decryption unit 41, may generate at least one variable solution set $(v_1, \ldots, v_n)$ for solving or decrypting the at least one Diophantine equation. Each variable may be derived from at least one integer of the at least one symmetric key. Using at least some variables of the generated variable solution set $(v_1, \ldots, v_n)$ (or a first subset thereof), the decryption apparatus 40, e.g. decryption unit 41, solves the at least one Diophantine equation, i.e. plurality of Diophantine equations to ascertain a plurality of partitioned integers (or partitioned pre-encryption or decrypted integers). The partitioned integers may then be provided to the integer de-partitioning unit. The first subset and the second subset may include mutually exclusive variables or may include common variable(s).

In a yet another further example (involving cipher text dependent variable, concealment variable, and integer partitioning), using the at least one symmetric key and a cipher text dependent variable, the decryption apparatus 40, e.g. decryption unit 41, may generate at least one variable solution set $(v_1, \ldots, v_n)$ for solving or decrypting the at least one Diophantine equation. Each variable may be derived from at least one integer of the at least one symmetric key and the cipher text dependent variable. Using at least some variables of the generated variable solution set $(v_1, \ldots, v_n)$ (or a first subset thereof) and a concealment variable (or a second subset of the generated variable solution set $(v_1, \ldots, v_n)$, the decryption apparatus 40, e.g. decryption unit 41, solves the at least one Diophantine equation, i.e. plurality of Diophantine equations to ascertain a plurality of partitioned integers (or partitioned pre-encryption or decrypted integers). The solving may include substituting the at least one variable solution set $(v_1, \ldots, v_n)$ into the Diophantine equations and modifying the Diophantine equations with the concealment variable, e.g. cipher text dependent variable, in this or different sequence. Modifying the at least one Diophantine equation may include performing addition, subtraction, multiplication, and/or division, using the concealment variable, on the Diophantine equations or their derivative in a manner to compensate for or negate the modification performed during encryption using the same concealment variable. The partitioned integers may then be provided to the integer de-partitioning unit. The first subset and the second subset may include mutually exclusive variables or may include common variable(s).

In block 407, the decryption apparatus 40, e.g. integer to plain text unit 45, converts the at least one pre-encrypted or decrypted integer into at least one plain text, and provides or outputs the at least one plain text to the plain text output unit 46.

In any preceding example (which includes integer partitioning) where partitioned integers are provided to the integer to plain text unit 45 to be converted to plain text, the decryption apparatus 40, e.g. integer de-partitioning unit, may de-partition the partitioned integers to ascertain or obtain at least one pre-encrypted integer $(M_1, \ldots, M_n)$. In particular, using a plurality of relatively prime integers and the partitioned integers, the pre-encryption integer $(M_1, \ldots, M_n)$ is ascertained or obtained. The relatively prime integers may be obtained from the at least one cipher text through substituting the at least one variable solution set $(v_1, \ldots, v_n)$ into the Diophantine equations during de-partitioning. The de-partitioning may include performing a plurality of Euclidean algorithm operations using the partitioned integers as a plurality of remainders and the relatively prime integers as a plurality of quotients, and deriving therefrom at least one pre-encryption integer $(M_1, \ldots, M_n)$. A count of the relatively prime integers, a count of the partitioned integers, and a count of the Diophantine equations to be decrypted are equivalent.

After block 407, the decryption apparatus 40, e.g. plain text output unit, may send or provide a plain text message which includes the at least one plain text to another apparatus.

Figure 4C:
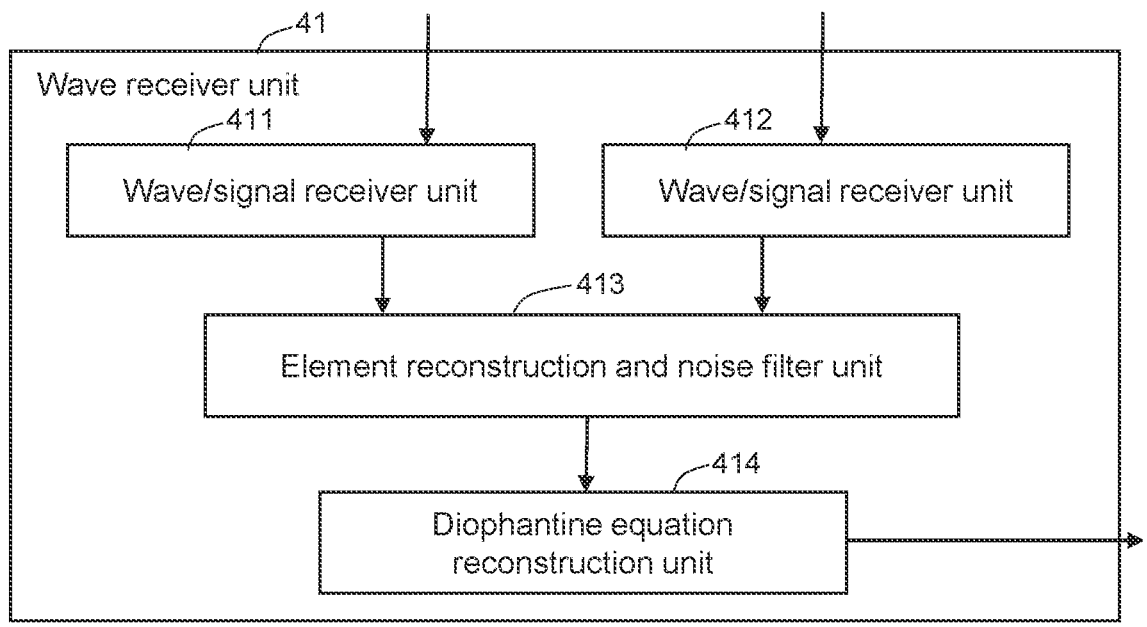
FIG. 4C is a schematic representation of a wave receiver unit.
Figure 4D:
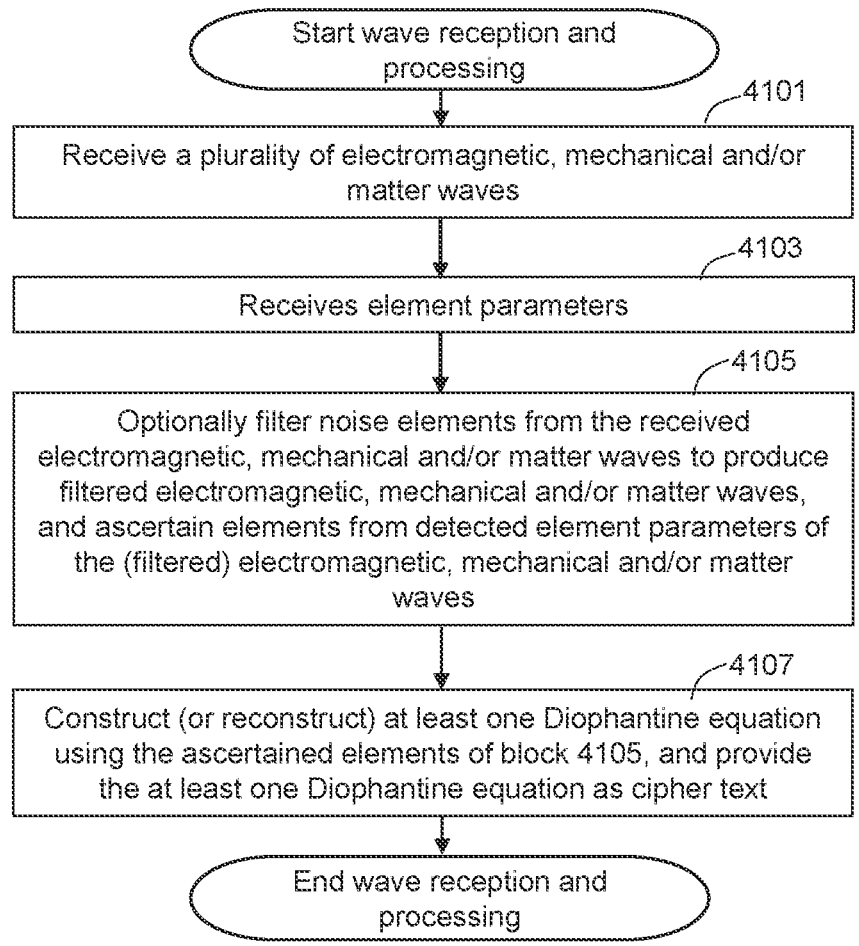
FIG. 4D is a simplified flow chart showing a wave reception and processing method.

Reception of Electromagnetic, Mechanical, and/or Matter Waves or Signals Describing Diophantine Equations Reference is made to FIGS. 4C and 4D, according to some embodiments of the invention.

FIG. 4C is a schematic representation of a wave receiver unit 41 which may be included in the cipher text input unit 42 or distinct therefrom and/or may be considered comprised in the decryption apparatus 40. The wave receiver unit 41 may comprise a wave/signal receiver unit 411, an element parameters input unit 412, an element construction and optional noise filter unit 413 which is communicably coupled to the wave/signal receiver unit 411 and the element parameters input unit 412, and a Diophantine equation construction unit 414.

The phrase "wave receiver unit" may generally refer to any device which is configured to at least receive electromagnetic, mechanical and/or matter waves from a device such as the aforementioned wave provision unit, wave generation unit and/or wave transmission unit.

FIG. 4D includes a flow chart of a wave reception and processing method which may be performed by the wave receiver unit 41 or other suitable wave receiver unit. The phrase "wave reception and processing method" may generally refer to any method for at least receiving electromagnetic, mechanical and/or matter waves; it may additionally include processing the received waves. Accordingly, it is to be appreciated that the phrase "wave reception and processing method" may be interchangeable with "wave reception method" and "wave processing method".

In block 4101, the wave receiver unit 41, e.g. wave/signal receiver unit 411, receives a plurality of electromagnetic, mechanical, and/or matter waves.

In block 4103, the wave receiver unit 41, e.g. element parameter input unit 412 receives element parameters according to the selected electromagnetic, mechanical, and/or matter waves to be employed for transmission.

In block 4105, the wave receiver unit 41, e.g. element reconstruction and noise filter unit 413, optionally filters noise elements from the received electromagnetic, mechanical, and/or matter waves to produce filtered electromagnetic, mechanical, and/or matter waves, and ascertains elements from detected characteristics, e.g. frequency, of the filtered electromagnetic, mechanical, and/or matter waves.

In block 4107, using the ascertained elements of block 4105, the wave receiver unit 41, e.g. Diophantine equation reconstruction unit 414, constructs (or reconstructs) at least one Diophantine equation, and outputs the at least one constructed Diophantine equation as cipher text. The at least one Diophantine equation may include any replacement Diophantine equation and/or any faux Diophantine equation. The cipher text is provided to the decryption unit 41 if the wave receiver unit 41 is comprised in the cipher text input unit 42. Alternatively, the cipher text is provided to the decryption unit 41 via the cipher text input unit 42 if the wave receiver unit 41 is distinct from the cipher text input unit 42.

Examples of key generation, encryption and decryption are illustrated below.

Example (basic)
Key Generation:
Receive command to generate key
Create 20 random integers denoted by
$(y_1, y_2, y_3, y_4, y_5, y_6, y_7, y_8, Y_9, Y_{10}, Z_1, Z_2, Z_3, Z_4, Z_5, Z_6, Z_7, Z_8, Z_9, Z_{10})$
Let $V_n = y_n * z_n$
Generate random integers
In this example,
$y_1=1, y_2=2, y_3=3, y_4=4, y_5=5, y_6=6, y_7=7, y_8=8, y_9=9, y_{10}=10$
$z_1=1, z_2=2, z_3=3, z_4=4, z_5=5, z_6=6, z_7=7, z_8=8, z_9=9, z_{10}=10$
$v_1=1*1=1$
$v_2=2*2=4$
$v_3=3*3=9$
$v_4=4*4=16$
$v_5=5*5=25$
$v_6=6*6=36$
$v_7=7*7=49$
$v_8=8*8=64$
$v_9=9*9=81$
$v_{10}=10*10=100$
End key generation
Start Encryption:
Acquire Plaintext message
Let the plain text message be "hi!"
Convert Plaintext to integer
Using the ASC II code "hi!" is represented by 104, 105, 33. "9" may be added in front of 2-digit characters to allow for easier encryption and decryption.
Hence, the integer to be encrypted will be "104105933".
Generate Diophantine equation based on symmetric key
From above, the value of $v_1, v_2, v_3, v_4, v_5, v_6, v_7, v_8, v_9, v_{10}$ are ascertained.

$v_1, v_2, v_3, v_4, v_5, v_6, v_7, v_8, v_9, v_{10}$ will be used as variables in the Diophantine equation.

Diophantine equation generated:

$$X^2 = 5v_1^{10005032} + 2(v_2^2)(v_1^{89}) + v_3^2 + v_4^2 + v_5^2 + v_6^2 + v_7^2 + v_8^2 + v_9^2 + v_{10}^3 + 10838045284785136$$

Artificial Intelligence

Based on historical and known methods to solve Diophantine equations, a prediction is made on insolvability or solvability of the above equation.

If the above Diophantine equation can be solved or predicted as solvable, a replacement Diophantine equation is generated. If the above Diophantine equation is predicted as insolvable, it will be used as cipher text.

Output Cipher Text
$X^2 = 5v_1^{10005032} + 2(v_2^2)(v_1^{89}) + v_3^2 + v_4^2 + v_5^2 + v_6^2 + v_7^2 + v_8^2 + v_9^2 + v_{10}^3 + 10838045284785136$ Provide electromagnetic, mechanical, and/or matter waves that describe the above Diophantine equation of the cipher text (see later examples depending on element parameters selected)

End of encryption
Start Decryption:
Acquire Cipher Text

Receive electromagnetic, mechanical, and/or matter waves, and construct (or reconstruct) Diophantine equation using detected elements of the received electromagnetic, mechanical, and/or matter waves (see later examples depending on element parameters selected)

$X^2 = 5v_1^{10005032} + 2(v_2^2)(v_1^{89}) + v_3^2 + v_4^2 + v_5^2 + v_6^2 + v_7^2 + v_8^2 + v_9^2 + v_{10}^2 + 10838045284785136$

Solve Diophantine equations using symmetric key
Given the following values,
$y_1=1, y_2=2, y_3=3, y_4=4, y_5=5, y_6=6, y_7=7, y_8=8, y_9=9, y_{10}=10$
$z_1=1, z_2=2, z_3=3, z_4=4, z_5=5, z_6=6, z_7=7, z_8=8, z_9=9, z_{10}=10$
Let $V_n = y_n * z_n$
$v_1=1*1=1$
$v_2=2*2=4$
$v_3=3*3=9$
$v_4=4*4=16$
$v_5=5*5=25$
$v_6=6*6=36$
$v_7=7*7=49$
$v_8=8*8=64$
$v_9=9*9=81$
$v_{10}=10*10=100$
Using the symmetric key, value of X is ascertained as $X=104105933$.
Generate Message Integer
From the above, $X=104105933$
Convert integer to message
Based on the ASC II code for integers 104, 105, 33, the message "hi!" is ascertained.
End of decryption
Example (involving Faux Diophantine equation)
Key Generation:
Receive command to generate key
Create 20 random integers denoted by
$(y_1, y_2, y_3, y_4, y_5, y_6, y_7, y_8, Y_9, Y_{10}, Z_1, Z_2, Z_3, Z_4, Z_5, Z_6, Z_7, Z_8, Z_9, Z_{10})$
Let $V_n = y_n * z_n$
Generate random integers
In this example,
$y_1=1, y_2=2, y_3=3, y_4=4, y_5=5, y_6=6, y_7=7, y_8=8, y_9=9, y_{10}=10$ $z_1=1$, $z_2=2$, $z_3=3$, $z_4=4$, $z_5=5$, $z_6=6$, $z_7=7$, $z_8=8$, $z_9=9$, $z_{10}=10$ $v_1=1*1=1$
$v_2=2*2=4$
$v_3=3*3=9$
$v_4=4*4=16$
$v_5=5*5=25$
$v_6=6*6=36$
$v_7=7*7=49$
$v_8=8*8=64$
$v_9=9*9=81$
$v_{10}=10*10=100$ End key generation
Start Encryption:
Acquire Plaintext message
Let the plain text message be "hi!"
Convert Plaintext to integer Using the ASC II code "hi!" is represented by 104, 105, 33. "9" may be added in front of 2-digit characters to allow for easier encryption and decryption.

Hence, the integer to be encrypted will be "104105933".
Generate Diophantine equation based on symmetric key
From the above, the value of $v_1$, $v_2$, $v_3$, $v_4$, $v_5$, $v_6$, $v_7$, $v_8$, $v_9$, $v_{10}$ are ascertained.

$v_1$, $v_2$, $v_3$, $v_4$, $v_5$, $v_6$, $v_7$, $v_8$, $v_9$, $v_{10}$ will be used as variables in the Diophantine equation.

Diophantine equation generated:

$$X^2 = 5v_1^{10005032} + 2(v_2^2)(v_1^{89}) + v_3^2 + v_4^2 + v_5^2 + v_6^2 + v_7^2 + v_8^2 + v_9^2 + v_{10}^3 + 10838045284785136$$

Generate Faux Diophantine equation $$X^2 = 12v_1^{10002} + 2(v_2^2)(v_1^{8129}) + v_3^2 + v_4^2 + v_5^2 + v_6^2 + v_7^2 + v_8^2 + v_9^2 + v_{10}^3 + 103090640$$

Solution Check [when using the symmetric key]
$X=10203.23478$
X is not an integer when
$v_1=1*1=1$
$v_2=2*2=4$
$v_3=3*3=9$
$v_4=4*4=16$
$v_5=5*5=25$
$v_6=6*6=36$
$v_7=7*7=49$
$v_8=8*8=64$
$v_9=9*9=81$
$v_{10}=10*10=100$ Since X is non-integer, the faux Diophantine equation can be used. If X is an integer, a replacement faux Diophantine equation is generated and its solution checked.

Artificial Intelligence
Based on historical and known methods to solve Diophantine equations, a prediction is made on insolvability or solvability of the above equation.

If the above Diophantine equation can be solved or predicted as solvable, a replacement Diophantine equation is generated. If the above Diophantine equation is predicted as insolvable, it will be used as cipher text.

Output Cipher Text $X^2 = 5v_1^{10005032} + 2(v_2^2)(v_1^{89}) + v_3^2 + v_4^2 + v_5^2 + v_6^2 + v_7^2 + v_8^2 + v_9^2 + v_{10}^3 + 10838045284785136$ $X^2 = 12v_1^{10002} + 2(v_2^2)(v_1^{8129}) + v_3^2 + v_4^2 + v_5^2 + v_6^2 + v_7^2 + v_8^2 + v_9^2 + v_{10}^3 + 103090640$ Provide electromagnetic, mechanical, and/or matter waves that describe the above Diophantine equations of the cipher text (see later examples depending on element parameters selected)

End of encryption
Start Decryption:
Acquire Cipher Text
Receive electromagnetic, mechanical, and/or matter waves, and construct (or reconstruct) Diophantine equations using detected elements of the received electromagnetic, mechanical, and/or matter waves (see later examples depending on element parameters selected)

$$X^2 = 5v_1^{10005032} + 2(v_2^2)(v_1^{89}) + v_3^2 + v_4^2 + v_5^2 + v_6^2 + v_7^2 + v_8^2 + v_9^2 + v_{10}^3 + 10838045284785136$$

$$X^2 = 12v_1^{10002} + 2(v_2^2)(v_1^{8129}) + v_3^2 + v_4^2 + v_5^2 + v_6^2 + v_7^2 + v_8^2 + v_9^2 + v_{10}^3 + 103090640$$

Solve Diophantine equations using symmetric key
Given the following values,
$y_1=1$, $y_2=2$, $y_3=3$, $y_4=4$, $y_5=5$, $y_6=6$, $y_7=7$, $y_8=8$, $y_9=9$, $y_{10}=10$
$z_1=1$, $z_2=2$, $z_3=3$, $z_4=4$, $z_5=5$, $z_6=6$, $z_7=7$, $z_8=8$, $z_9=9$, $z_{10}=10$ Let $V_n = y_n * z_n$
$v_1=1*1=1$
$v_2=2*2=4$
$v_3=3*3=9$
$v_4=4*4=16$
$v_5=5*5=25$
$v_6=6*6=36$
$v_7=7*7=49$
$v_8=8*8=64$
$v_9=9*9=81$
$v_{10}=10*10=100$ Using the symmetric key, the value of X is ascertained as $X=104105933$ or $X=10203.23478$ Since $X=10203.23478$, it is known that this is the faux Diophantine equation or faux cipher text, while $X=104105933$ provides the real or genuine Diophantine equation or cipher text.

Generate Message Integer
From the above, $X=104105933$
Convert Integer to message Based on the ASC II code for integers 104, 105, 33, the message "hi!" is ascertained
End of decryption
Example (involving cipher text dependent variable)
Key Generation:
Receive command to generate key
Create 20 random integers denoted by
$(y_1, y_2, y_3, y_4, y_5, y_6, y_7, y_8, Y_9, Y_{10}, Z_1, Z_2, Z_3, Z_4, Z_5, Z_6, Z_7, Z_8, Z_9, Z_{10})$
Create a cipher dependent variable, $K_n$
Let $V_n = y_n * z_n * K_n$
Generate random integers
In this example,
$y_1=1$, $y_2=2$, $y_3=3$, $y_4=4$, $y_5=5$, $y_6=6$, $y_7=7$, $y_8=8$, $y_9=9$, $y_{10}=10$
$z_1=1$, $z_2=2$, $z_3=3$, $z_4=4$, $z_5=5$, $z_6=6$, $z_7=7$, $z_8=8$, $z_9=9$, $z_{10}=10$
$K_n=10$
$v_1=1*1*10=10$
$v_2=2*2*10=40$
$v_3=3*3*10=90$
$v_4=4*4*10=160$
$v_5=5*5*10=250$
$v_6=6*6*10=360$
$v_7=7*7*10=490$
$v_8=8*8*10=640$ $v_9=9*9*10=810$
$v_{10}=10*10*10=1000$
End key generation
Start Encryption:
Acquire Plaintext message
Let the plain text message be "hi!"
Convert Plaintext to integer
Using the ASC II code "hi!" is represented by 104, 105, 33. "9" may be added in front of 2-digit characters to allow for easier encryption and decryption.
Hence, the integer to be encrypted will be "104105933".
Generate Diophantine equation based on symmetric key
From the above, the value of $v_1, v_2, v_3, v_4, v_5, v_6, v_7, v_8, v_9, v_{10}$ are ascertained. $v_1, v_2, v_3, v_4, v_5, v_6, v_7, v_8, v_9, v_{10}$ will be used as variables in the Diophantine equation.
Diophantine equations generated:

$$X^2 = 5v_1^{10} + v_2^2 v_3^2 + v_4^2 + v_5^2 + v_6^2 + v_7^2 + v_8^2 + v_9^2 + v_{10}^3 + 10837994284269289$$

Note that the value of $K_n$ will be changed from 10 to 5 when generating cipher text in subsequent encryption as the Diophantine equation has a term $5v_1^{10}$ with power to 10 and coefficient 5
The values of $v_1 \ldots v_{10}$ will change respectively to the following values in subsequent encryption:
$v_1=1*1*5=5$
$v_2=2*2*5=20$
$v_3=3*3*5=45$
$v_4=4*4*5=80$
$v_5=5*5*5=125$
$v_6=6*6*5=180$
$v_7=7*7*5=245$
$v_8=8*8*5=320$
$v_9=9*9*5=105$
$v_{10}=10*10*5=500$
Artificial Intelligence Based on historical and known methods to solve Diophantine equations, a prediction is made on insolvability or solvability of the above equation.
If the above Diophantine equation can be solved or predicted as solvable, a replacement Diophantine equation is generated. If the above Diophantine equation is predicted as insolvable, it will be used as cipher text.
Output Cipher Text
$X^2 = 5v_1^{10} + v_2^2 v_3^2 + v_4^2 + v_5^2 + v_6^2 + v_7^2 + v_8^2 + v_9^2 + v_{10}^3 + 10837994284269289$
Provide electromagnetic, mechanical, and/or matter waves that describe the above Diophantine equation of the cipher text (see later examples depending on element parameters selected)
End of encryption
Start Decryption:
Acquire Cipher Text
Receive electromagnetic, mechanical, and/or matter waves, and construct (or reconstruct) Diophantine equation using detected elements of the received electromagnetic, mechanical, and/or matter waves (see later examples depending on element parameters selected)
$X^2 = 5v_1^{10} + v_2^2 v_3^2 + v_4^2 + v_5^2 + v_6^2 + v_7^2 + v_8^2 + v_9^2 + v_{10}^3 + 10837994284269289$
Solve Diophantine equations using symmetric key
Given the following values,
$y_1=1, y_2=2, y_3=3, y_4=4, y_5=5, y_6=6, y_7=7, y_8=8, y_9=9, y_{10}=10$
$z_1=1, z_2=2, z_3=3, z_4=4, z_5=5, z_6=6, z_7=7, z_8=8, z_9=9, z_{10}=10$
$K_n=10$
Let $V_n = y_n * z_n * K_n$
$v_1=1*1*10=10$
$v_2=2*1*20=40$
$v_3=3*1*30=90$
$v_4=4*1*40=160$
$v_5=5*1*50=250$
$v_6=6*1*60=360$
$v_7=7*1*70=490$
$v_8=8*1*80=640$
$v_9=9*1*90=810$
$v_{10}=10*10*10=1000$
Using the symmetric key and cipher dependent generated variables, the following is obtained:
X=104105933
The value of $K_n$ will be changed from 10 to 5 when decrypting cipher text in subsequent decryption as there is a term $5v_1^{10}$ with power 10 and coefficient 5.
The values of $v_1 \ldots v_{10}$ will change respectively to the following values in subsequent decryption:
$v_1=1*1*5=5$
$v_2=2*2*5=20$
$v_3=3*3*5=45$
$v_4=4*4*5=80$
$v_5=5*5*5=125$
$v_6=6*6*5=180$
$v_7=7*7*5=245$
$v_8=8*8*5=320$
$v_9=9*9*5=105$
$v_{10}=10*10*5=500$
Generate Message Integer
From the above, X=104105933
Convert Integer to message
Based on the ASC II code 104, 105, 33, the message "hi!" is ascertained. End of decryption
Example (involving concealment variable)
Key Generation:
Receive command to generate key
Create 22 random integers denoted by
$(y_1, y_2, y_3, y_4, y_5, y_6, y_7, y_8, Y_9, Y_{10}, Z_1, Z_2, Z_3, Z_4, Z_5, Z_6, Z_7, Z_8, Z_9, Z_{10})$
Let $V_n = y_n * Z_n$
Generate random integers
In this example,
$y_1=1, y_2=2, y_3=3, y_4=4, y_5=5, y_6=6, y_7=7, y_8=8, y_9=9, y_{10}=10, y_{11}=11$
$z_1=1, z_2=2, z_3=3, z_4=4, z_5=5, z_6=6, z_7=7, z_8=8, z_9=9, z_{10}=10, z_{11}=11$
$v_1=1*1=1$
$v_2=2*2=4$
$v_3=3*3=9$
$v_4=4*4=16$
$v_5=5*5=25$
$v_6=6*6=36$
$v_7=7*7=49$
$v_8=8*8=64$
$v_9=9*9=81$
$v_{10}=10*10=100$
$v_{11}=11*11=121$
End key generation
Start Encryption:
Acquire Plaintext message
Let the plain text message be "hi!"
Convert Plaintext to integer
Using the ASC II code "hi!" is represented by 104, 105, 33. "9" may be added in front of 2-digit characters to allow for easier encryption and decryption.
Hence, the integer to be encrypted will be "104105933".

Generate Diophantine equation based on symmetric key

From the above, the values of $v_1$, $v_2$, $v_3$, $v_4$, $v_5$, $v_6$, $v_7$, $v_8$, $v_9$, $v_{10}$, $v_{11}$ are ascertained.

$v_1$, $v_2$, $v_3$, $v_4$, $v_5$, $v_6$, $v_7$, $v_8$, $v_9$, $v_{10}$ will be used as variables in the Diophantine equation and $v_{11}$ will be used as the concealment variable.

Diophantine equations generated:

$$X^2 = 5v_1^{10005032} + 2(v_2^2)(v_1^{89}) + v_3^2 + v_4^2 + v_5^2 + v_6^2 + v_7^2 + v_8^2 + v_9^2 + v_{10}^3 + 10838045284785015$$

Artificial Intelligence

Based on historical and known methods to solve Diophantine equations, a prediction is made on insolvability or solvability of the above equation.

If the above Diophantine equation can be solved or predicted as solvable, a replacement Diophantine equation is generated. If the above Diophantine equation is predicted as insolvable, it will be used as cipher text.

Output Cipher Text $X^2 = 5v_1^{10005032} + 2(v_2^2)(v_1^{89}) + v_3^2 + v_4^2 + v_5^2 + v_6^2 + v_7^2 + v_8^2 + v_9^2 + v_{10}^3 + 10838045284785015$ Provide electromagnetic, mechanical, and/or matter waves that describe the above Diophantine equation of the cipher text (see later examples depending on element parameters selected)

End of encryption

Start Decryption:

Acquire Cipher Text

Receive electromagnetic, mechanical, and/or matter waves, and construct (or reconstruct) Diophantine equation using detected elements of the received electromagnetic, mechanical, and/or matter waves (see later examples depending on element parameters selected)

$$X^2 = 5v_1^{10005032} + 2(v_2^2)(v_1^{89}) + v_3^2 + v_4^2 + v_5^2 + v_6^2 + v_7^2 + v_8^2 + v_9^2 + v_{10}^3 + 10838045284785015$$

Solve Diophantine equations using symmetric key

Given the following values, $y_1=1$, $y_2=2$, $y_3=3$, $y_4=4$, $y_5=5$, $y_6=6$, $y_7=7$, $y_8=8$, $y_9=9$, $y_{10}=10$, $y_{11}=11$ $z_1=1$, $z_2=2$, $z_3=3$, $z_4=4$, $z_5=5$, $z_6=6$, $z_7=7$, $z_8=8$, $z_9=9$, $z_{10}=10$, $z_{11}=11$ Let $V_n = y_n * Z_n$ $v_1 = 1*1 = 1$
$v_2 = 2*2 = 4$
$v_3 = 3*3 = 9$
$v_4 = 4*4 = 16$
$v_5 = 5*5 = 25$
$v_6 = 6*6 = 36$
$v_7 = 7*7 = 49$
$v_8 = 8*8 = 64$
$v_9 = 9*9 = 81$
$v_{10} = 10*10 = 100$
$v_{11} = 11*11 = 121$ Using the symmetric key, the following is obtained:

$X^2 = 10838045285800368$ (At this stage, the Diophantine equation is not yet solved as X from the above results in a non-integer value.)

Adding the concealment variable vii=121 to the right hand side of the equation, the following is obtained:

$X^2 = 10838045285800489$ $X = 104105933$ (At this stage, the Diophantine equation is solved as X is an integer value.)

Generate Message Integer

From the above, $X = 104105933$

Convert Integer to message

Based on the ASC II code 104,105, 33, the message "hi!" is ascertained.

End of decryption

Example (involving integer partitioning)

Key Generation:

Receive command to generate key

Create 14 random integers denoted by $(y_1, y_2, y_3, y_4, y_5, y_6, y_7, Z_1, Z_2, Z_3, Z_4, Z_5, Z_6, Z_7)$ Let $v_n = y_n + (10)^{z_n}$ where $v_n$ is the variable to the Diophantine equation.

Generate random integers

In this example, $v_1 = 1 + 10^1 = 11$
$v_2 = 2 + 10^1 = 102$
$v_3 = 3 + 10^1 = 1003$
$v_4 = 4 + 10^1 = 10004$
$v_5 = 5 + 10^1 = 100005$
$v_6 = 6 + 10^1 = 1000006$
$v_7 = 7 + 10^1 = 10000007$ Check that integers fulfil parameters End key generation Start Encryption:

Acquire Plaintext message

Let the plain text message be "hi!"

Convert Plaintext to integer

Using the ASC II code "hi!" is represented by 104, 105, 33. "9" may be added in front of 2-digit characters to allow for easier encryption and decryption.

Hence, the integer to be encrypted will be "104105933".

Partition Integer based on relatively prime coordinates 3 random relatively prime integers are selected:

$p_1 = 512$
$p_2 = 729$
$p_3 = 1953125$ 104105933 mod 512 = 461
104105933 mod 729 = 359
104105933 mod 1953125 = 590308

Generate Diophantine equation based on symmetric key

From the above, the values of $v_1$, $v_2$, $v_3$, $v_4$, $v_5$, $v_6$, $v_7$ are ascertained.

$v_1$, $v_2$, $v_3$, $v_4$, $v_5$, $v_6$, $v_7$ will be used as variables in the Diophantine equation Diophantine equations generated:

$$v_1 X = 11[A(v_7 - 10v_6 + v_5 - 10v_4 + v_3 - 4v_2 + v_1 - 6) + 4v_2 + 5(v_1)^2 - 552]$$

$$v_1 X = 11[B(v_7 - 10v_6 + v_5 - 10v_4 + v_3 - 10v_2 + (v_1)^2 + 713) + 3(v_1)^2 - 4]$$

$$v_1 X = 11[C(v_7 - 10v_6 + v_5 - 10v_4 + v_3 - 10v_2 + 1000(v_1)^3 + 622230) + (v_3)^2 - 415701]$$

In this example, 3 new random variables A, B, C are generated

Artificial Intelligence

Based on historical and known methods to solve Diophantine equations, a prediction is made on insolvability or solvability of the above equation.

If the above Diophantine equation can be solved or predicted as solvable, a replacement Diophantine equation is generated. If the above Diophantine equation is predicted as insolvable, it will be used as cipher text.

Output Cipher Text $v_1 X = 11[A(v_7 - 10v_6 v_5 - 10v_4 v_3 - 4v_2 + v_1 - 6) + 4v_2 + 5(v_1)^2 - 552]$ $v_1 X = 11[B(v_7 - 10v_6 v_5 - 10v_4 v_3 - 10v_2 + (v_1)^2 + 713) + 3(v_1)^2 - 4]$ $v_1 X = 11[C(v_7 - 10v_6 v_5 - 10v_4 v_3 - 10v_2 + 1000(v_1)^3 + 622230) + (v_3)^2 - 415701]$ Provide electromagnetic, mechanical, and/or matter waves that describe the above Diophantine equations of the cipher text (see later examples depending on element parameters selected)

End of encryption

Start Decryption:

Acquire Cipher Text

Receive electromagnetic, mechanical, and/or matter waves, and construct (or reconstruct) Diophantine equations using detected elements of the received electromagnetic, mechanical, and/or matter waves (see later examples depending on element parameters selected)

$$v_1X=11[A(v_7-10v_6+v_5-10v_4+v_3-4v_2+v_1-6)+4v_2+5(v_1)^2-552]$$

$$v_1X=11[B(v_7-10v_6+v_5-10v_4+v_3-10v_2+(v_1)^2+713)+3(v_1)^2-4]$$

$$v_1X=11[C(v_7-10v_6+v_5-10v_4+v_3-10v_2+1000(v_1)^3+622230)+(v_3)^2-415701]$$

Solve Diophantine equations using symmetric key and cipher dependent variable

Given the following values, $v_1=1+10^1=11$
$v_2=2+10^1=102$
$v_3=3+10^1=1003$
$v_4=4+10^1=10004$
$v_5=5+10^1=100005$
$v_6=6+10^1=1000006$
$v_7=7+10^1=10000007$ Using the symmetric key, the following is obtained:

$X=A(512)+461$
$X=B(729)+359$
$X=C(1953125)+590308$

Generate Message Integer

From solving the equations using integer de-partitioning, $X=104105933$.

Convert Integer to message

Based on the ASC II code 104, 105, 33, the message "hi!" is ascertained.

End of decryption

Example (involving cipher text dependent variable, concealment variable, and integer partitioning)

Key Generation:

Receive command to generate key

Create 20 random integers denoted by $(y_1, y_2, y_3, y_4, y_5, y_6, y_7, y_8, Y_9, Y_{10}, Z_1, Z_2, Z_3, Z_4, Z_5, Z_6, Z_7, Z_8, Z_9, Z_{10})$ Let $v_n y_n+(K_n)^{z_n}$ where $K_n$ is the cipher dependent variable and $v_n$ is the variable to the Diophantine equation.

Generate random integers In this example, $K_1=K_2=K_3=K_4=K_5=K_6=K_7=K_8=L_9=K_{10}=10$
$y_1=1, y_2=2, y_3=3, y_4=4, y_5=5, y_6=6, y_7=7, y_8=8, y_9=9, y_{10}=10$
$z_1=1, z_2=2, z_3=3, z_4=4, z_5=5, z_6=6, z_7=7, z_8=8, z_9=9, z_{10}=10$
$v_1=1+10^1=11$
$v_2=2+10^1=102$
$v_3=3+10^1=1003$
$v_4=4+10^1=10004$
$v_5=5+10^1=100005$
$v_6=6+10^1=1000006$
$v_7=7+10^1=10000007$
$v_8=8+10^8=100000008$
$v_9=9+10^9=1000000009$
$v_{10}=10+10^{10}=10000000010$ Check that integers fulfil parameters End key generation Start Encryption:

Acquire Plaintext message

Let the plain text message be "hi!"

Convert Plaintext to integer

Using the ASC II code "hi!" is represented by 104, 105, 33. "9" may be added in front of 2-digit characters to allow for easier encryption and decryption.

Hence, the integer to be encrypted will be "104105933".

Partition Integer based on relatively prime coordinates 3 random relatively prime integers are selected:

$p_1=512$
$p_2=729$
$p_3=1953125$ 104105933 mod 512=461
104105933 mod 729=359
104105933 mod 1953125=590308

Generate Diophantine equation based on symmetric key and cipher dependent variables From the above, the values of $v_1, v_2, v_3, v_4, v_5, v_6, v_7, v_8, v_9, v_{10}$ are ascertained.

$v_1, v_2, v_3, v_4, v_5, v_6, v_7$ will be used as variables in the Diophantine equation $v_8, v_9, v_{10}$ will be concealment variables, i.e. variables used to conceal the true Diophantine equation Diophantine equations generated:

$$v_1X=11[A(v_7-10v_6+v_5-10v_4+v_3-4v_2+v_1-100000014)+4v_2+5(v_1)^2-552]$$

$$v_1X=11[B(v_7-10v_6+v_5-10v_4+v_3-10v_2+(v_1)^2-999999296)+3(v_1)^2-4]$$

$$v_1X=11[C(v_7-10v_6+v_5-10v_4+v_3-10v_2+1000(v_1)^3-9999377780)+(v_3)^2-415701]$$

In this example, 3 new random variables A, B, C are generated, each equation is concealed by subtracting $v_1 \cdot A \cdot v_8$, $v_1 \cdot B \cdot v_9$ and $v_1 \cdot C \cdot v_{10}$ respectively.

Artificial Intelligence

Based on historical and known methods to solve Diophantine equations, a prediction is made on insolvability or solvability of the above equation.

If the above Diophantine equation can be solved or predicted as solvable, a replacement Diophantine equation is generated. If the above Diophantine equation is predicted as insolvable, it will be used as cipher text.

Output Cipher Text $v_1X=11[A(v_7-10v_6+v_5-10v_4+v_3-4v_2+v_1-100000014)+4v_2+5(v_1)^2-552]$ $v_1X=11[B(v_7-10v_6+v_5-10v_4+v_3-10v_2+(v_1)^2-999999296)+3(v_1)^2-4]$ $v_1X=11[C(v_7-10v_6+v_5-10v_4+v_3-10v_2+1000(v_1)^3+9999377780)+(v_3)^2-415701]$ Note: the cipher text dependent variable, K, did not change value.

Provide electromagnetic, mechanical, and/or matter waves that describe the above Diophantine equation of the cipher text (see later examples depending on element parameters selected)

End of encryption

Start Decryption:

Acquire Cipher Text

Receive electromagnetic, mechanical, and/or matter waves, and construct (or reconstruct) Diophantine equation using detected elements of the received electromagnetic, mechanical, and/or matter waves (see later examples depending on element parameters selected)

$v_1X=11[A(v_7-10v_6+v_5-10v_4+v_3-4v_2+v_1-100000014)+4v_2+5(v_1)^2-552]$ $v_1X=11[B(v_7-10v_6+v_5-10v_4+v_3-10v_2+(v_1)^2-999999296)+3(v_1)^2-4]$ $v_1X=11[C(v_7-10v_6+v_5-10v_4+v_3-10v_2+1000(v_1)^3-9999377780)+(v_3)^2-415701]$

Note: the cipher dependent variable, K, did not change value.

Solve Diophantine equations using symmetric key and cipher dependent variable

Given the following values, $v_1=1+10^1=11$
$v_2=2+10^1=102$
$v_3=3+10^1=1003$
$v_4=4+10^1=10004$
$v_5=5+10^1=100005$
$v_6=6+10^1=1000006$
$v_7=7+10^1=10000007$
$v_8=8+10^8=100000008$
$v_9=9+10^9=1000000009$
$v_{10}=10+10^{10}=10000000010$ The true Diophantine equations are obtained by adding the concealed variables $(v_1)(A)v_8$, $(v_1)(B)v_9$, $(v_1)(C)v_{10}$ to the respective equations:

$v_1X=11[A(v_7-10v_6+v_5-10v_4+v_3-4v_2+v_1-100000014)+4v_2+5(v_1)^2-552]+(v_1)(A)v_8$ $v_1X=11[B(v_7-10v_6+v_5-10v_4+v_3-10v_2+(v_1)^2-999999296)+3(v_1)^2-4]+(v_1)(B)v_9$ $v_1X=11[C(v_7-10v_6+v_5-10v_4+v_3-10v_2+1000(v_1)^3+9999377780)+(v_3)^2-415701]+(v_1)(C)v_{10}$

Using the symmetric key and cipher dependent generated variable K, the following is obtained:

X=A(512)+461
X=B(729)+359
X=C(1953125)+590308

Generate Message Integer

From solving the equations using integer de-partitioning, X=104105933.

Convert Integer to message

Based on the ASC II code 104, 105, 33, the message "hi!" is ascertained.

End of decryption

Examples of element parameterisation are illustrated below.

Example (Soundwave) with the equal temperament scale—"Keyboard Element Parameters"

Based on the aforementioned element parameters and rules, there would be 18 distinct elements.

Figure 5A:
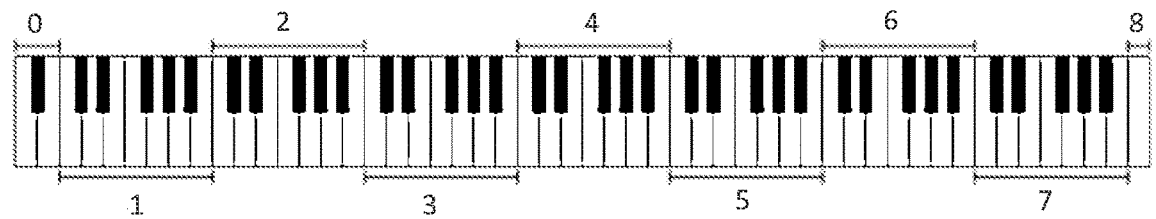
FIG. 5A shows a keyboard having 7 octaves of C Major Scale.
Figure 5B:
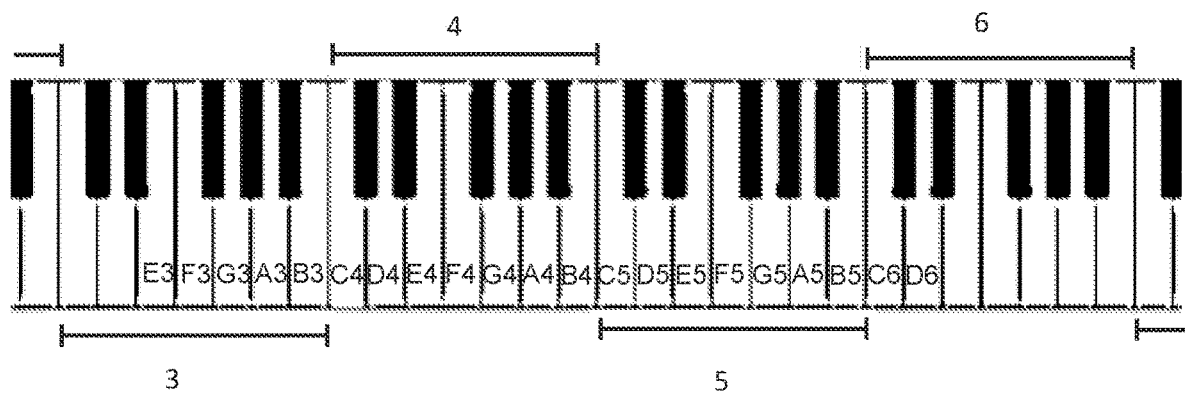
FIG. 5B shows element assignment defined in the following table.

The following table shows 18 keys on the C Major Scale ("White Keys") are allocated to respectively denote the 18 distinct elements and 3 additional noise elements. FIG. 5A shows a keyboard having 7 octaves of C Major Scale while FIG. 5B shows element assignment defined in the following table.

| Key | Frequency (HZ) | Element No. | Remarks |
|---|---|---|---|
| E3 | 164.81 | 1 | Start of Equation |
| F3 | 174.61 | 2 | End of equation |
| G3 | 196 | 3 | Number 1 |
| A3 | 220 | 4 | Number 2 |
| B3 | 246.94 | 5 | Number 3 |
| C4 | 261.63 | 6 | Number 4 |
| D4 | 293.66 | 7 | Number 5 |
| E4 | 329.63 | 21 | Noise |
| F4 | 349.23 | 8 | Number 6 |
| G4 | 392 | 9 | Number 7 |
| A4 | 440 | 10 | Number 8 |
| B4 | 493.88 | 11 | Number 9 |
| C5 | 523.25 | 12 | Number 0 |
| D5 | 587.33 | 13 | The operator "+" Plus |
| E5 | 659.25 | 14 | The operator "-" Minus |
| F5 | 698.46 | 15 | The operator "*" Multiply |
| G5 | 783.99 | 16 | The operator "^" Power of |
| A5 | 880 | 17 | The operator "=" Equals |
| B5 | 987.77 | 18 | Denote a Variable |
| C6 | 1046.5 | 19 | Noise |
| D6 | 1174.66 | 20 | Noise |

Example

At the transmitter:

Step 0: Element Parameters
Step 1: Start Wave Transmission
Step 2: Receive Diophantine equation $v_0^5=V_1^5+V_2^5$ In order to achieve the concept of undecidable data transmission, the following conditions must be satisfied:

Data exists if a Diophantine equation has solutions
Data does not exist if a Diophantine equation has no solutions Step 3a: Generate Elements Elements:
"1" denotes start of equation
"18, 12, 16, 7, 17" denotes " $v_0^5=$ "
"18, 3, 16, 7, 13, 18, 4, 16, 7" denotes " $v_1^5+v_2^5$ "
"2" denotes end of equation Step 3b: Noise Generator (Optional)
Step 4: Wave Generation In this example there is no time period specified, a period of 0.25 seconds will be used.

Generate the following sound frequencies for 0.25 seconds each in order

Start Transmission
E3-0.25 seconds denotes the start of Diophantine equation
B5- 0.25 seconds,
C5-0.25 seconds,
G5-0.25 seconds,
D4-0.25 seconds, and
A5-0.25 seconds denote " $v_0^5=$ "
B5-0.25 seconds,
G3-0.25 seconds,
G5-0.25 seconds,
D4-0.25 seconds,
D5-0.25 seconds,
B5-0.25 seconds,
A3-0.25 seconds,
G5-0.25 seconds, and
D4-0.25 seconds denote " $v_1^5+v_2^5$ "
F3-0.25 seconds denotes the end of Diophantine equation
End Transmission At the receiver:

Step 0: Receive the element parameters
Step 1: Receive Wave Transmission

E3-0.25 seconds
B5-0.25 seconds
C5-0.25 seconds
G5-0.25 seconds
D4-0.25 seconds
A5-0.25 seconds
B5-0.25 seconds
G3-0.25 seconds
G5-0.25 seconds
D4-0.25 seconds
D5-0.25 seconds
B5-0.25 seconds
A3-0.25 seconds
G5-0.25 seconds
D4-0.25 seconds
F3-0.25 seconds Step 2: Reconstruct Elements
"1" denotes start of equation
"18, 12, 16, 7, 17" denotes "$v_0^5=$"
"18, 3, 16, 7, 13, 18, 4, 16, 7" denotes "$v_1^5+v_2^5$"
"2" denotes end of equation
Step 3: Reconstruct Diophantine equation
$v_0^5=v_1^5+v_2^5$ Example (Microwave) with the cosmic microwave background—"Region Element Parameters" [Frequency Hopping]

Based on the aforementioned element parameters and rules, there would be 18 distinct elements. The cosmic microwave background is most evident between microwaves with frequency 70 GHz to 217 GHz.

Figure 5C:
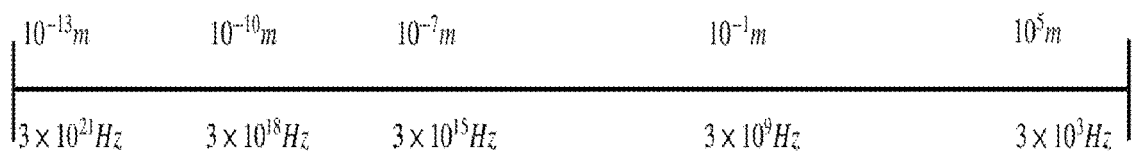
FIG. 5C shows a schematic representation of the electromagnetic spectrum and frequency band of microwaves.

The following table shows 18 regions (frequency bands) from 70 GHz to 217 GHz are respectively allocated to the 18 elements. Any frequency within the band will indicate an element allocated. FIG. 5C shows a schematic representation of the electromagnetic spectrum and frequency band of microwaves.

| Frequency (GHz) | Element No. | Remarks |
|---|---|---|
| 70-78 | 1 | Start of Equation |
| 78-86 | 2 | End of equation |
| 86-94 | 3 | Number 1 |
| 94-102 | 4 | Number 2 |
| 102-110 | 5 | Number 3 |
| 110-118 | 6 | Number 4 |
| 118-126 | 7 | Number 5 |
| 126-134 | 8 | Number 6 |
| 134-142 | 9 | Number 7 |
| 142-150 | 10 | Number 8 |
| 150-158 | 11 | Number 9 |
| 158-166 | 12 | Number 0 |
| 166-174 | 13 | The operator "+" Plus |
| 174-182 | 14 | The operator "−" Minus |
| 182-190 | 15 | The operator "*" Multiply |
| 190-198 | 16 | The operator "^" Power of |
| 198-206 | 17 | The operator "=" Equals |
| 206-217 | 18 | Denote a Variable |

Example
At the transmitter:
Step 0: Element Parameters
Step 1: Start Wave Transmission
Step 2: Receive Diophantine equation
$v_0^5=V_1^5+v_2^5$
In order to achieve the concept of undecidable data transmission, the following conditions must be satisfied:
Data exists if a Diophantine equation has solutions
Data does not exist if a Diophantine equation has no solutions
Step 3a: Generate Elements
Elements:
"1" denotes start of equation
"18, 12, 16, 7, 17" denotes "$v_0^5=$"
"18, 3, 16, 7, 13, 18, 4, 16, 7" denotes "$v_1^5+v_2^5$"
"2" denotes end of equation
Step 3b: Noise Generator (Optional)
Step 4: Wave Generation
In this example there is no time period specified, a period of 0.25 seconds will be used.
Generate the following sound frequencies for 0.25 secs each in order Start Transmission
70-78 GHZ-0.25 seconds denotes the start of Diophantine equation
206-217 GHZ-0.25 seconds,
158-166 GHZ-0.25 seconds,
190-198 GHZ-0.25 seconds,
118-126 GHZ-0.25 seconds, and
198-206 GHZ-0.25 seconds denote "$v_0^5$"
206-217 GHZ-0.25 seconds,
86-94 GHZ-0.25 seconds,
190-198 GHZ-0.25 seconds,
118-126 GHZ-0.25 seconds,
166-174 GHZ-0.25 seconds,
206-217 GHZ-0.25 seconds,
94-102 GHZ-0.25 seconds,
190-198 GHZ-0.25 seconds, and
118-126 GHZ-0.25 seconds denote "$v_1^5+v_2^5$"
78-86 GHZ-0.25 seconds denotes the end of Diophantine equation End Transmission It is to be appreciated that any frequency within the band is counted as an element signal, e.g. for the frequency band 70-78 GHz, frequencies of 71 GHz, 72 GHz and 73.5 GHZ are counted.

At the receiver
Step 0: Receive the element parameters
Step 1: Receive Wave Transmission
70-78 GHZ-0.25 seconds
206-217 GHZ-0.25 seconds
158-166 GHZ-0.25 seconds
190-198 GHZ-0.25 seconds
118-126 GHZ-0.25 seconds
198-206 GHZ-0.25 seconds
206-217 GHZ-0.25 seconds
86-94 GHZ-0.25 seconds
190-198 GHZ-0.25 seconds
118-126 GHZ-0.25 seconds
166-174 GHZ-0.25 seconds
206-217 GHZ-0.25 seconds
94-102 GHZ-0.25 seconds
190-198 GHZ-0.25 seconds
118-126 GHZ-0.25 seconds
78-86 GHZ-0.25 seconds
Step 2: Reconstruct Elements
"1" denotes start of equation
"18, 12, 16, 7, 17" denote "$v_0^5=$"
"18, 3, 16, 7, 13, 18, 4, 16, 7" denote "$v_1^5+v_2^5$"
"2" denotes end of equation
Step 3: Reconstruct Diophantine equation
$v_0^5=v_1^5+v_2^5$
Example (Bluetooth)—"Bluetooth Element Parameters"
The number or count of unique signals generated by Bluetooth devices and
their channels may be represented by the following equation:

$$\sum_{x=1}^{n} (_n^x C)(2^x)$$

where n is the number of channels
where x is the number of Bluetooth devices
where C is the combination maths function
Designing a system with 2 Bluetooth devices and 3 channels
A Bluetooth device may have three channels each generating two signals, as follows:

| Channels | Signal |
|---|---|
| Channel 1 | 0 or 1 |
| Channel 2 | 0 or 1 |
| Channel 3 | 0 or 1 |

Accordingly, a single Bluetooth device with 3 channels is capable of generating 6 unique signals, as follows:

| Bluetooth Device 1 Channels | Signal |
|---|---|
| Channel 1 | 0 |
| Channel 1 | 1 |
| Channel 2 | 0 |
| Channel 2 | 1 |
| Channel 3 | 0 |
| Channel 3 | 1 |

Accordingly, 2 Bluetooth devices, each with 3 channels, are capable of generating 12 unique signals, as follows:

| Bluetooth Device 1 Channels | Signal | Bluetooth Device 2 Channels | Signal |
|---|---|---|---|
| Channel 1 | 0 | Channel 2 | 0 |
| Channel 1 | 0 | Channel 2 | 1 |
| Channel 1 | 0 | Channel 3 | 0 |
| Channel 1 | 0 | Channel 3 | 1 |
| Channel 1 | 1 | Channel 2 | 0 |
| Channel 1 | 1 | Channel 2 | 1 |
| Channel 1 | 1 | Channel 3 | 0 |
| Channel 1 | 1 | Channel 3 | 1 |
| Channel 2 | 0 | Channel 3 | 0 |
| Channel 2 | 0 | Channel 3 | 1 |
| Channel 2 | 1 | Channel 3 | 0 |
| Channel 2 | 1 | Channel 3 | 1 |

Based on the aforementioned element parameters and rules, there would be 18 distinct elements. Each channel may be allocated about 1 MHz frequency band from frequencies from about 2.402 GHz to about 2.480 GHz. Signal refers to binary code signal per channel with a 0 or 1. The following table shows allocation of 18 element parameters.

| Unique Signal Number | Diophantine Element Parameter | Bluetooth Device 1 | | Bluetooth Device 2 | |
|---|---|---|---|---|---|
| | | Channel | Signal | Channel | Signal |
| 1 | Start | 1 | 0 | unactivated | unactivated |
| 2 | End | 1 | 1 | unactivated | unactivated |
| 3 | Number 1 | 2 | 0 | unactivated | unactivated |
| 4 | Number 2 | 2 | 1 | unactivated | unactivated |
| 5 | Number 3 | 3 | 0 | unactivated | unactivated |
| 6 | Number 4 | 3 | 1 | unactivated | unactivated |
| 7 | Number 5 | 1 | 0 | 2 | 0 |
| 8 | Number 6 | 1 | 0 | 2 | 1 |
| 9 | Number 7 | 1 | 0 | 3 | 0 |
| 10 | Number 8 | 1 | 0 | 3 | 1 |
| 11 | Number 9 | 1 | 1 | 2 | 0 |
| 12 | Number 0 | 1 | 1 | 2 | 1 |
| 13 | Operator "+" | 1 | 1 | 3 | 0 |
| 14 | Operator "−" | 1 | 1 | 3 | 1 |
| 15 | Operator "×" | 2 | 0 | 3 | 0 |
| 16 | Operator "⁀" | 2 | 0 | 3 | 1 |
| 17 | Operator "=" | 2 | 1 | 3 | 0 |
| 18 | Denote Variable | 2 | 1 | 3 | 1 |

Given that Bluetooth may have 79 channels of 1 MHz from about 2.402 GHz to about 2.480 GHz, devices (e.g. laptop computer, notebook computer, mobile phone, tablet, smart watches, audio ear phones, etc.) using 2 Bluetooth devices (transmitter and receiver) can create up to 26 unique channels (26*3=78) (each channel requiring 3 regular Bluetooth channels) with Diophantine wave transmission.

While the above examples of element parameterisation are based on frequency of waves, it is to be appreciated that the other element parameters or wave characteristic, e.g. amplitude, wavelength, phase, speed, etc., may be used to transmit elements.

Furthermore, as an option, it is to be appreciated that the wave transmission may comprise one or more wave types (e.g. electromagnetic, mechanical, matter, or any combination thereof) and/or one or more wave sub-types (e.g. wave sub-types of electromagnetic waves include radio waves, microwaves, infrared, ultraviolet, visible light, X-rays, gamma rays).

Furthermore, as an option, an element may directly represent any Diophantine equation, e.g. element 19 may represent the equation $v^5+v_2^{30}$. Furthermore, as an option, there may be one to one correspondence between each component of a Diophantine equation to a respective wave characteristic to provide more efficient transmission. In other words, a Diophantine equation may be defined by different aforesaid wave characteristics of electromagnetic, mechanical, and/or matter waves. For example, in the foregoing Example (Soundwave) with the equal temperament scale—"Keyboard Element Parameters", each of the 18 elements, comprising of mathematical operators, a variable, and the numbers 0 to 9, which are used to construct Diophantine equations has a defined corresponding wave characteristic. The wave characteristics to be used may be that of mechanical wave (e.g. sound) and frequency.

Embodiments of the invention provide several advantages including but not limited to the following:

Cryptography security is improved by the use of undecidable encryption (e.g. insolvable Diophantine equation(s), faux Diophantine equation(s) (which conceal true Diophantine equation(s) and thereby rendering the solution less obvious), concealment variable (which conceal true Diophantine equation(s) and thereby rendering the solution less obvious), cipher text dependent variable (which removes bounds of variables), and/or integer partitioning (which conceals an original plain text).

Cipher text generated by encryption may potentially be processed or deciphered by computers despite requiring a long period of time as the encrypted data transmission provides a decidable communication channel, (i.e. in a decidable language, such as binary code, over a communication channel, such as a medium for transmitting and receiving data. Embodiments of the invention further improve cryptography security by providing an undecidable communication channel, (i.e. in an undecidable language, such as Diophantine equations, over a communication channel such as electromagnetic, mechanical, and/or matter waves) as Diophantine equation transmission is an undecidable language which a computer may never be able to process or decipher.

Energy efficiency of data transmission is improved by the use of element parameters on Diophantine equations. Conventionally, ASCII code representing binary code is used to send alphanumeric characters, and has 256 characters or $2^8$, which would require 8 signals to be sent per character, as each signal represents either 0 or 1. For example, transmitting the following equation: $456x=77y+z$ by binary code would require a total of 80 signals. In embodiments of the invention, with the use of Diophantine element parameters, transmitting the same equation would require a total of 10 signals (i.e. 1 signal per character). Accordingly, using Diophantine element parameters would be more energy efficient by a ratio of 8:1 (i.e. by a factor of 8) on the assumption that the energy it takes to send each signal is the same.

Data transmission efficiency is improved by the use of element parameters on Diophantine equations. Devices, such as Bluetooth devices, are configured with a maximum number (or count) of signals that can be sent per second, e.g. 500 kb/s. Since Diophantine element parameters require less signal count than binary code by a factor of 8, this implies that device can transmit Diophantine equations potentially 8 times more efficiently by element parameters than by binary code. This would increase speed of encrypted data transmission, e.g. transfer between laptops, Bluetooth devices, etc.

As Diophantine equations can have infinite solutions, they have potential to contain infinite data.

Furthermore, prior cryptology method and apparatus, such as in US 2006/0251247 A1 (Akiyama et al.), generally have not utilised artificial intelligence. Recent development and advances in artificial intelligence research has opened the possibility of its usage across various fields, some of these recent developments include the use of artificial intelligence in the field of mathematics, according to "Deep learning for symbolic mathematics" by Facebook Artificial Intelligence Researchers (Lample & Charton, 2020). In embodiments of the invention, the use of artificial intelligence enables exclusion of any class of Diophantine equations which has been solved or is known to be solvable in encryption and automatic improvement through learning from training data, including new and updated data, and improving prediction with experience or training.

Universal Diophantine equations

As mentioned above, detailed proof and the existence of universal Diophantine equations are published by J. P Jones (The Journal of Symbolic Logic, September 1982, Vol. 47, No. 3 pp 549-571 published by: Association for Symbolic Logic). The following pairs (D,X) are known classes of universal Diophantine equations:

(4, 58), (8, 38), (12, 32), (20, 28), (24, 26), (28, 25), (96, 21), (2668, 19), ($2*10^5$, 14), ($1.3*10^{44}$, 12), ($4.6*10^{44}$, 11), ($8.6*10^{44}$, 10)

The existence of universal Diophantine equations and mathematical methods prove that all Diophantine Equation solvability problems [whether a given Diophantine equation has a solution] can be reduced to Diophantine equation solvability problems with fixed finite number of variables with fixed finite degree. This represents an important property of Diophantine equations that distinguishes it from other type of polynomials. Hence for example (note: any of the above pairs of varying number of variables and degree is possible) it will be possible to design element parameters with 28 variables and maximum degree of 20 that can represent all Diophantine Equation solvability problems.

It is to be appreciated that the flow charts showing logic flows are representative of exemplary methodologies for performing novel aspects of the invention. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

The flow charts showing logic flow may be implemented in software, firmware, hardware, or any combination thereof. In software and firmware embodiments, the logic flow may be implemented by computer executable instructions or code stored on a non-transitory computer readable medium or machine readable medium, such as an optical, magnetic or semiconductor storage. The computer-executable instructions are configured to direct at least one computer processor to perform the logic flow. The embodiments are not limited in this context.

It is to be appreciated that the apparatuses described herein are representative of exemplary apparatuses for performing novel aspects of the invention. Those skilled in the art will understand and appreciate that the apparatuses are not limited by their elements described herein. In any of the apparatuses described herein, it may comprise at least one memory unit and at least one processor communicably coupled thereto. The at least one processor may be any type of computer processor, such as a microprocessor, an embedded processor, a digital signal processor (DSP), a network processor, a multi-core processor, a single core processor, or other device configured to execute code or computer-executable instructions to perform or implement the flowcharts, algorithms, processes, or operations detailed herein. The at least one memory unit may be a non-transitory computer readable medium or machine readable medium for storing or comprising the code or computer-executable instructions. Examples include, but are not limited to, random access memory (RAM), read only memory (ROM), logic blocks of a field programmable gate array (FPGA), erasable programmable read only memory (EPROM), and electrically erasable programmable ROM (EEPROM).

It is to be understood that the embodiments and features described above should be considered exemplary and not restrictive. Many other embodiments will be apparent to those skilled in the art from consideration of the specification and practice of the invention. Furthermore, certain terminology has been used for the purposes of descriptive clarity, and not to limit the disclosed embodiments of the invention.

The invention claimed is:

1. An encryption method comprising:
   a. receiving at least one plain text;
   b. converting the at least one plain text to at least one pre-encryption integer (M1, . . . , Mn);
   c. using the at least one pre-encryption integer (M1, . . . , Mn) and at least one variable solution set (v1, . . . , $v_n$) derived from at least one symmetric key, generating at least one Diophantine equation solvable by the at least one variable solution set (v1, . . . , $v_n$), including:
      using a first subset of the at least one variable solution set (v1, . . . , $v_n$), generating at least one initial Diophantine equation; and
      using a concealment variable derived from a second subset of the at least one variable solution set (v1, . . . , $v_n$), modifying the at least one initial Diophantine equation to generate the at least one Diophantine equation;
      predicting, using a trained AI model, insolvability or solvability of the at least one Diophantine equation;
      providing the at least one Diophantine equation as at least one cipher text if the at least one Diophantine equation is predicted, by the trained AI model, as insolvable, including:
         ascertaining a plurality of elements which define the at least one Diophantine equation; and
         providing a plurality of electromagnetic, mechanical, and/or matter waves having at least an element parameter defined by the plurality of elements.

2. The encryption method of claim 1, wherein the plurality of elements include indicators of a start and an end of the at least one Diophantine equation, mathematical operators, variables, coefficients of the variables, and powers of the variables.

3. The encryption method of claim 1, wherein the plurality of electromagnetic, mechanical, and/or matter waves are selected from the group consisting of Bluetooth having frequency band between about 2.402 GHz and about 2.480 GHz, and microwaves having frequency band between about 70 GHz and about 217 GHz.

4. The encryption method of claim 1, wherein the plurality of elements are defined based on at least one wave characteristic of the electromagnetic, mechanical, and/or matter waves, wherein the at least one wave characteristic is selected from the group consisting of frequency, amplitude, wavelength, speed, and phase.

5. The encryption method of claim 1, wherein the at least one Diophantine equation are defined by different wave characteristics of the plurality of electromagnetic, mechanical, and/or matter waves, wherein at least some of the different wave characteristics are selected from the group consisting of frequency, amplitude, wavelength, speed, and phase.

6. An encryption apparatus comprising:
   a. at least one memory unit for storing computer-executable instructions; and
   at least one processor communicably coupled to the at least memory unit and configured to: execute the computer-executable instructions to perform the method according to claim 1.

7. A non-transitory, computer readable medium comprising computer-executable instructions configured to direct at least one computer processor to perform the method according to claim 1.

8. An encryption apparatus comprising:
   a. a plain text input unit configured to receive at least one plain text;
   b. a symmetric key input unit configured to receive at least one symmetric key;
   c. a plain text to integer unit communicably coupled to the plain text input unit and configured to: receive the at least one plain text from the plain text input unit and convert the at least one plain text to at least one pre-encryption integer (M1, . . . , Mn);
   d. a polynomial generation unit communicably coupled to the symmetric key unit and configured to: receive the at least one symmetric key from the symmetric key unit and derive at least one variable solution set (v1, . . . , $v_n$) using the at least one symmetric key;
   an encryption unit communicably coupled to the plain text to integer unit, the polynomial generation unit, wherein the encryption unit is configured to: receive the at least one variable solution set (v1, . . . , $v_n$) from the polynomial generation unit, and generate at least one Diophantine equation solvable by the at least one variable solution set (v1, . . . , $v_n$) using the at least one pre-encryption integer (M1, . . . , Mn) and the at least one variable solution set (v1, . . . , $v_n$) by being configured to: generate at least one initial Diophantine equation using a first subset of the at least one variable solution set (v1, . . . , $v_n$), and modify the at least one initial Diophantine equation using a concealment variable which is derived from a second subset of the at least one variable solution set (v1, . . . , $v_n$); and
   an AI unit communicably coupled to the encryption unit and configured to: receive the at least one Diophantine equation, the AI unit having a trained AI model configured to: predict insolvability or solvability of the at least one Diophantine equation,
   a wave provision unit communicably coupled to the encryption unit,
   wherein the encryption unit is configured to: provide the at least one Diophantine equation as at least one cipher text to the wave provision unit if the at least one Diophantine equation is predicted as insolvable by the AI model,
   wherein the wave provision unit is configured to: ascertain a plurality of elements which define the at least one Diophantine equation; and provide a plurality of electromagnetic, mechanical, and/or matter waves having at least an element parameter defined by the plurality of elements.

9. The encryption apparatus of claim 8, wherein the plurality of elements include indicators of a start and an end of the at least one Diophantine equation, mathematical operators, variables, coefficients of the variables, and powers of the variables.

10. The encryption apparatus of claim 8, wherein the plurality of electromagnetic, mechanical, and/or matter waves are selected from the group consisting of Bluetooth having frequency band between about 2.402 GHz and about 2.480 GHz, and microwaves having frequency band between about 70 GHz and about 217 GHz.

11. The encryption apparatus of claim 8, wherein the plurality of elements are defined based on at least one wave characteristic of the electromagnetic, mechanical, and/or matter waves, wherein the at least one wave characteristic is selected from the group consisting of frequency, amplitude, wavelength, speed, and phase.

12. The encryption apparatus of claim 8, wherein the at least one Diophantine equation are defined by different wave characteristics of the plurality of electromagnetic, mechanical, and/or matter waves, wherein at least some of the different wave characteristics are selected from the group consisting of frequency, amplitude, wavelength, speed, and phase.

13. A decryption method comprising:
   receiving a plurality of electromagnetic, mechanical, and/or matter waves;

ascertaining a plurality of elements of the plurality of electromagnetic, mechanical, and/or matter waves;

using the plurality of elements, constructing at least one Diophantine equation;

using a symmetric key, deriving at least one variable solution set $(v1, \ldots, v_n)$ for solving the at least one Diophantine equation;

using the at least one variable solution set $(v1, \ldots, v_n)$, solving the at least one Diophantine equation to ascertain at least one pre-encryption integer $(M1, \ldots, Mn)$, including:

using a first subset of the at least one variable solution set $(v1, \ldots, v_n)$, ascertaining the at least one initial integer; and using a concealment variable derived from a second subset of the at least one variable solution set $(v1, \ldots, v_n)$, modifying the at least one initial integer to ascertain the at least one pre-encryption integer $(M1, \ldots, Mn)$; and converting the at least one pre-encryption integer $(M1, \ldots, Mn)$ to at least one plain text.

14. The decryption method of claim 13, wherein the plurality of elements include indicators of a start and an end of the at least one Diophantine equation, mathematical operators, variables, coefficients of the variables, and powers of the variables.

15. The decryption method of claim 13, wherein the plurality of electromagnetic, mechanical, and/or matter waves are selected from the group consisting of Bluetooth having frequency band between about 2.402 GHz and about 2.480 GHz, and microwaves having frequency band between about 70 GHz and about 217 GHz.

16. The decryption method of claim 13, wherein the plurality of elements are defined based on at least one wave characteristic of the electromagnetic, mechanical, and/or matter waves, wherein the at least one wave characteristic is selected from the group consisting of frequency, amplitude, wavelength, speed, and phase.

17. A decryption apparatus comprising:
  a. at least one memory unit for storing computer-executable instructions; and
  at least one processor communicably coupled to the at least memory unit and configured to: execute the computer-executable instructions to perform the method according to claim 13.

18. A non-transitory, computer readable medium comprising computer-executable instructions configured to direct at least one computer processor to perform the method according to claim 13.

19. A decryption apparatus comprising:
  a. a wave receiver unit configured to:
    receive a plurality of electromagnetic, mechanical, and/or matter waves;
    ascertain a plurality of elements of the plurality of electromagnetic, mechanical, and/or matter waves;
    using the plurality of elements, construct at least one Diophantine equation as cipher text;
  b. a symmetric key input unit configured to receive at least one symmetric key;
  c. a decryption unit communicably coupled to the wave receiver unit and the symmetric key input unit, and configured to:
    receive the symmetric key from the symmetric key input unit and the at least one Diophantine equation from the wave receiver unit;
    using the symmetric key, derive at least one variable solution set $(v1, \ldots, v_n)$ for solving the at least one Diophantine equation;
    using the at least one variable solution set $(v1, \ldots, v_n)$, solve the at least one Diophantine equation to ascertain at least one pre-encryption integer $(M1, \ldots, Mn)$ by being configured to:
      using a first subset of the at least one variable solution set $(v1, \ldots, v_n)$, ascertain at least one initial integer;
      using a concealment variable derived from a second subset of the at least one variable solution set $(v1, \ldots, v_n)$, modify the at least one initial integer to ascertain the at least one pre-encryption integer $(M1, \ldots, Mn)$; and
  d. an integer to plain text unit communicably coupled to the decryption unit and configured to:
    receive the at least one pre-encryption integer $(M1, \ldots, Mn)$ from the decryption unit, and
    convert the at least one pre-encryption integer $(M1, \ldots, Mn)$ to at least one plain text.

20. The decryption apparatus of claim 19, wherein the plurality of elements include indicators of a start and an end of the at least one Diophantine equation, mathematical operators, variables, coefficients of the variables, and powers of the variables.

21. The decryption apparatus of claim 19, wherein the plurality of electromagnetic, mechanical, and/or matter waves are selected from the group consisting of Bluetooth having frequency band between about 2.402 GHz and about 2.480 GHz, and microwaves having frequency band between about 70 GHz and about 217 GHz.

22. The decryption apparatus of claim 19, wherein the plurality of elements are defined based on at least one wave characteristic of the electromagnetic, mechanical, and/or matter waves, wherein the at least one wave characteristic is selected from the group consisting of frequency, amplitude, wavelength, speed, and phase.

* * * * *